United States Patent
Gupta et al.

(10) Patent No.: US 11,463,389 B1
(45) Date of Patent: Oct. 4, 2022

(54) MESSAGE MODIFICATION BASED ON DEVICE COMPATABILITY

(71) Applicant: Rovi Guides, Inc., San Jose, CA (US)

(72) Inventors: Vikram Makam Gupta, Karnataka (IN); Reda Harb, Bellevue, WA (US); Vishwas Sharadanagar Panchaksharaiah, Tiptur (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/308,847

(22) Filed: May 5, 2021

(51) Int. Cl.
| | |
|---|---|
| *H04L 51/066* | (2022.01) |
| *H04L 51/043* | (2022.01) |
| *H04L 51/222* | (2022.01) |
| *H04L 51/046* | (2022.01) |
| *H04L 67/306* | (2022.01) |

(52) U.S. Cl.
CPC .......... *H04L 51/066* (2013.01); *H04L 51/043* (2013.01); *H04L 51/046* (2013.01); *H04L 51/222* (2022.05); *H04L 67/306* (2013.01)

(58) Field of Classification Search
None
See application file for complete search history.

(56) References Cited

U.S. PATENT DOCUMENTS

| | | | | |
|---|---|---|---|---|
| 7,450,567 | B1 * | 11/2008 | Mamnani | H04L 51/36 370/352 |
| 8,086,253 | B1 | 12/2011 | Kalamkar et al. | |
| 8,521,857 | B2 * | 8/2013 | Maxwell | H04N 21/8166 715/802 |
| 8,965,986 | B1 * | 2/2015 | Acharya | H04M 15/844 717/113 |
| 9,503,868 | B2 * | 11/2016 | Gandhi | H04W 4/12 |
| 10,243,891 | B2 * | 3/2019 | Rao | H04L 51/22 |
| 10,362,171 | B1 * | 7/2019 | Bird | H04M 7/0048 |
| 10,536,407 | B1 * | 1/2020 | Doorn | G06F 3/04842 |

(Continued)

FOREIGN PATENT DOCUMENTS

| | | | |
|---|---|---|---|
| EP | 1793543 A1 | 6/2007 | |
| WO | WO 2009/082097 | * 7/2009 | ............ H04W 80/10 |

OTHER PUBLICATIONS

International Search Report and Written Opinion for International Application No. PCT/US2021/064454, dated Apr. 4, 2022.

*Primary Examiner* — Backhean Tiv
(74) *Attorney, Agent, or Firm* — Haley Guiliano LLP

(57) ABSTRACT

Systems and methods are presented herein for modifying messages transmitted between a first computing device and a second computing device based on the determination of a context of messages transmitted between the first and second computing devices. A first message, prepared to be transmitted to a second computing device, is prepared at a first computing device. Based on an identifier corresponding to the second computing device, a plurality of devices communicably coupled to the second computing device are determined. Selectable options are generated at the first computing device which, when selected, determine which of the second computing device or one of the plurality of communicably coupled devices will receive the transmitted message. Based on the selection of an option, the message may be modified to fit the format of the device corresponding to the selected option and transmitted to the device corresponding to the selected option.

18 Claims, 13 Drawing Sheets

(56) References Cited

U.S. PATENT DOCUMENTS

| | | | |
|---|---|---|---|
| 10,841,896 B2* | 11/2020 | DeLuca | H04L 67/26 |
| 10,951,507 B1* | 3/2021 | Slavin | H04W 12/082 |
| 11,025,569 B2* | 6/2021 | Lind | G06F 3/04842 |
| 11,122,165 B1 | 9/2021 | Thiyagarajan et al. | |
| 2001/0012286 A1* | 8/2001 | Huna | H04M 3/537 |
| | | | 370/352 |
| 2002/0022453 A1* | 2/2002 | Balog | H04L 67/04 |
| | | | 455/41.2 |
| 2002/0136227 A1* | 9/2002 | Laarhuis | H04L 67/303 |
| | | | 370/408 |
| 2003/0065727 A1 | 4/2003 | Clarke et al. | |
| 2003/0224814 A1* | 12/2003 | Qu | H04W 4/12 |
| | | | 455/466 |
| 2008/0077673 A1* | 3/2008 | Thomas | H04L 51/24 |
| | | | 340/506 |
| 2009/0052442 A1* | 2/2009 | Chen | H04L 65/1069 |
| | | | 370/389 |
| 2010/0004008 A1* | 1/2010 | Abolrous | H04L 51/063 |
| | | | 455/466 |
| 2011/0296506 A1* | 12/2011 | Caspi | H04L 9/0838 |
| | | | 726/6 |
| 2012/0117604 A1* | 5/2012 | Kisel | H04N 21/44224 |
| | | | 725/109 |
| 2012/0265803 A1* | 10/2012 | Ha | G06F 16/27 |
| | | | 709/203 |
| 2012/0329496 A1* | 12/2012 | Cenciarelli | H04M 1/72436 |
| | | | 455/466 |
| 2013/0072153 A1* | 3/2013 | Lawson | H04L 63/10 |
| | | | 455/410 |
| 2013/0110942 A1* | 5/2013 | Shen | H04L 51/066 |
| | | | 709/206 |
| 2013/0227030 A1* | 8/2013 | Eidelson | H04L 51/32 |
| | | | 709/206 |
| 2014/0059142 A1* | 2/2014 | Gandhi | H04W 4/12 |
| | | | 709/206 |
| 2014/0082151 A1* | 3/2014 | Chen | H04L 67/025 |
| | | | 709/219 |
| 2015/0188899 A1* | 7/2015 | Bakar | H04L 63/0807 |
| | | | 726/10 |
| 2015/0215356 A1* | 7/2015 | Kalburgi | H04W 76/45 |
| | | | 370/352 |
| 2015/0323974 A1* | 11/2015 | Shuster | G08B 21/182 |
| | | | 713/320 |
| 2016/0073242 A1* | 3/2016 | Joseph | H04W 4/021 |
| | | | 455/466 |
| 2017/0093769 A1* | 3/2017 | Lind | H04L 65/60 |
| 2017/0180289 A1* | 6/2017 | Chiappone | H04L 67/2823 |
| 2017/0201480 A1* | 7/2017 | Petterson | H04L 51/32 |
| 2018/0048595 A1 | 2/2018 | Dotan-Cohen et al. | |
| 2018/0098230 A1* | 4/2018 | Obaidi | H04W 4/08 |
| 2018/0234496 A1* | 8/2018 | Ratias | H04L 9/3239 |
| 2018/0351901 A1* | 12/2018 | Snider | G06N 20/20 |
| 2018/0365026 A1* | 12/2018 | Jernigan | G06N 20/00 |
| 2019/0028781 A1* | 1/2019 | Bigio | H04N 21/4126 |
| 2019/0342239 A1 | 11/2019 | Brandt et al. | |
| 2019/0377829 A1* | 12/2019 | Anders | G06F 16/9558 |

* cited by examiner

MESSAGE MODIFICATION BASED ON DEVICE COMPATABILITY

BACKGROUND

The present disclosure is directed to systems and methods for modifying the format of messages transmitted between a first computing device to a second computing device and, more particularly, to systems and methods that modify the format of messages transmitted between the first computing device and the second computing device based on a determination of the context of the messages transmitted between the first and second computing devices.

SUMMARY

When a message is being prepared for transmission from a first computing device to a second computing device, the message may include content from a website uniform resource locator or an application. The drafter of the message may only want to show a portion or particular aspect of the reference and, in order to direct the recipient to that aspect, will need to incorporate a string of characters to describe which part of the reference the recipient should focus on. Current approaches for messaging enable a user who is drafting a message to incorporate a reference into a message, but are deficient in that they do not enable a user to embed within the messaging application a focused summary of the reference, which can lead to the desired aspects of the reference being unreviewed by the recipient. Recipients may not want to leave the messaging application to review a link of a reference to find the pertinent information referenced in the message, which can lead to incomplete or cumbersome conversations.

In another approach, a drafter of a message can incorporate the reference by copying a link into the message. The drafter of the message and the recipient of the message often have different devices. The drafter receives a preview of the drafted message before sending in a format supported by their device and may describe aspects of the reference based on their preview. When the message is transmitted to the recipient's device, the recipient will receive the message in a format supported by their device. As a result, the received version of the message may have a format that alters the reference such that the aspects referenced by the drafter are in different locations or may be non-existent, depending on the message protocol differences between devices.

Systems and methods described herein are for modifying the format of messages transmitted between a first computing device and a second computing device based on a determination of the context of messages transmitted between devices. For one aspect of the present disclosure, a first message is received at a first computing device via a messaging application for transmission to a second computing device. The message includes a reference to either a web page, an application, or some combination thereof. The context of the message is determined. Based on the reference and the context, a determination of whether the message needs to be modified is made. A modified message is generated if a modification is required. The modified message includes content from the reference that is embedded into the message such that it is accessible through the messaging application through which the message is received and viewed. The modified message with the embedded content is then transmitted over a communication network from the first device to the second device.

These techniques solve the problems of other approaches described above. In particular, these techniques include a modification of a message at a computing device based on a detection of a device type of a receiving computing device to determine if enough or the correct information will be communicated in spite of format changes that might occur during transmission of the message. Additionally, when multiple devices are communicatively coupled, alternative transmitting devices are recommended based on message context to ensure a received message can be adequately perceived without a lossy conversion so as to communicate the intended and pertinent details of the reference without requiring a receiver to interpret a message from a drafter or requiring the receiver to leave the messaging application to find more information related to the reference. Thus, the approaches described in the disclosure enable a focused and clear continuation of a chain of communication providing options to change devices for transmitting and receiving to avoid format conversions creating cumbersome exchanges.

In some embodiments, the message for transmission is received by an input at the first computing device. The input includes a selection of an identifier of the second computing device as well as a string of characters that comprise the message. Based on the selection of the identifier, a communication stream between the first computing device and the second computing device is identified for transmitting the message.

In some embodiments, a chain of communication between the first computing device and the second computing device is identified based on an identifier of the second computing device selected on the first computing device. The chain of communication includes a plurality of message that each include a string of characters. Each string of characters may be utilized to identify at least one subject matter discussed in the chain of communication. For each subject matter, a subset of messages within the chain of communication may be identified for the purpose of extracting a context to format the message.

In some embodiments, a time stamp is determined for each message within the chain of communication as well as the message for transmission. For determining context, only the messages within a threshold period of time of the message for transmission are utilized for determining a context that is to be used to modify the message for transmission. For example, the threshold period of time may be 24 hours such that messages generated and transmitted within a day of the message for transmission being drafted are utilized for determining a context.

In some embodiments, identifying a subset of messages within the chain of communication may be accomplished by comparing the subject matter of the message to the subject matter of messages within the chain of communication and incorporating a similarity threshold. For example, if the subject matter of the message is not exactly the same as the subject matter of a message within the chain of communication but the two subject matters are related such that they are within a similarity score of each other, the draft message and the message within the chain of communication will be considered as having a same subject matter, and that message within the chain of communication will be used to extract a context for modifying the drafted message.

In some embodiments, a primary subject matter of the message is identified and is used to generate a summary of the message. The message may be modified to only incorporate the primary subject matter of the message. Alternatively, an alternative message may be generated at the first computing device so the message can be compared to the alternative message prior to transmission. Based on an input selecting either the message or the alternative message, the selected version of the message will be transmitted to the second computing device.

When a first user initiates a chain of communication with a second user, the first user does not know the type of device the second user may view the communication on. For example, a first user may initiate a chat through an application which is supported by a personal computer interface, a mobile phone interface, or a keyboard-less tablet interface. The second user has the option to view the communication on any of these devices, but the content of the message may be best supported by only one of the available interfaces. Different devices from different manufacturers often have different messaging protocols which lead to formatting errors when attempting to translate a message from a first device from a first manufacturer to a format supported by a second device from a second manufacturer. This can lead to a message received by the second user that is either cumbersome to read or might be missing information intended to be sent by the first user.

In another approach, a user at a first device can determine that the second user is receiving communications at a second device that is incompatible with the first device based on read receipts or other indicators transmitted to the first user's device after the second user's device receives a communication. The receipts or indicators, however, do not provide a user with information to determine if the second user has access to secondary devices that are more compatible with the first user's device or an option to transfer the chain of communication to a more compatible device format. Additionally, the receipts or indicators do not provide information regarding the nature of the incompatibility which may lead to information being lost in the conversion of the sent message to the second device's protocols.

For another aspect of the disclosure, a message is received at a first computing device through a messaging application for transmission to a second computing device by a communication network. A plurality of devices communicatively is coupled by one or more local communication paths to the second computing device. A plurality of selectable options, corresponding to the plurality of devices, are generated for display at the first computing device.

These techniques solve the problems of other approaches described above. In particular, these techniques include a modification of a message at a computing device based on a detection of a device type of a receiving computing device to enable a drafter of a message to review the format of their message before transmission to determine if the conversation might best be continued through a different device. Additionally, when multiple devices are communicatively coupled, alternative transmitting devices are recommended based on message context to ensure a received message can be adequately perceived without a lossy conversion. Thus, the approaches described continuously monitors the messages received and transmitted in the chain of communication to ascertain a context, as opposed to relying on the direct inputs corresponding to draft messages. Messages can be seamlessly converted through a single messaging interface, and devices can be changed to enhance the effectiveness of the communication intended by each message.

In some embodiments, a user profile is identified on the second computing device. The user profile may be used to identify the plurality of devices communicatively coupled to the second computing device by the local communication stream. For example, a user profile may accessed on multiple devices simultaneously and the profile may incorporate indicators of each respective device that the profile was used to log in on.

In some embodiments, the location of the second computing device is determined. Based on the location of the second computing device and the proximity of the second computing device to a plurality of devices corresponding to the user profile, the plurality of devices may be given a status as an option to send the message to instead of the second computing device. For example, if the second computing device is determined to be in the same room as a communicatively coupled device, then the communicatively coupled device may be identified as a device available to receive the message. Conversely, if a communicatively coupled device is determined to be in a house while the second computing device is determined to be moving (e.g., in a car), the communicatively coupled device may not be identified as a device available to receive the message.

In some embodiments, each of the plurality of communicatively coupled devices is assigned an active status. For example, a plurality of devices may be identified as being communicatively coupled to the user profile or the second device. However, not all of the devices may be powered on and are therefore not assigned active status that shows the powered off devices as available to receive the message.

In some embodiments, a first device type of the first computing device is identified and a second device type of the second computing device is also identified. The first device type is compared to the second device type. For example, a first device may be a mobile device and the second device may be smart watch. If it is determined that the first device type does not match the second device type, the message may be modified to accommodate a format which enables the message to be transmitted to include pertinent information from the original draft of the message such that the pertinent information can be adequately perceived at the second computing device.

In some embodiments, a recommendation to transmit the message to a device communicatively coupled to the second computing device is based on a comparison of the first device type to the second device type and each of the device types of a plurality of devices communicatively coupled to the second computing device. For example, the first device may have a device type that is a mobile device and the message includes embedded content that is lost when received by a smart watch, which is determined to be the device type of the second computing device. A mobile device communicatively coupled to the second computing device may be identified and recommended for receiving the transmission of the message.

In some embodiments, selectable options are generated to display a plurality of devices communicatively coupled to the second computing device. The selectable options comprise primary and secondary icons. The primary icons indicate a device and a device type for each device coupled to the second computing device. The secondary icons indicate a status of each device. For example, the status may include a proximity indication, an active indication, or a compatibility indication.

Some messages are created based on a certain context, and the context can include the use of an application to generate a message. Applications to generate messages for transmission can include voice-to-text interfaces, which enable a user to draft a message without stopping another activity, such as driving. Current approaches do not readily notify recipients of the message of this context. For example, current approaches may provide indications to a trained user that the format of the message is different from a drafter's typical message style by capitalizing certain letters or providing a phonetic spelling. However, this does not provide the typical user with a clear indication of the context of the received message.

Additionally, a recipient preparing a response to the first message may want to continue the conversation with the original drafter without interrupting the activity the original drafter (e.g. a first user) is currently performing (e.g., driving). The recipient will not be notified of the first user's context without the appropriate flags, and the first user may not know that the original recipient has responded without pausing their current activity to determine if the original recipient has responded. Current approaches do not enable a recipient of a first received message to send a response based on the context of the first received message such that the conversation can continue without interrupting a current set of activities. For example, the recipient may receive a voice-to-text message and may respond, but will not know if the original drafter is able to perceive the message based on what they are currently doing. A preferred approach would incorporate the mentioned notification of context such that the recipient can draft a message which, when received, can be perceived by the original drafter (e.g., a response to a message sent from a user driving will be received as a text-to-voice message such that it is perceived when received by the user who is driving).

For another aspect of the disclosure, a first message context is determined based on a first message transmitted over a communication network from a first computing device to a second computing device. For example, the first message context may be that the first message was generated using a voice-to-text translation application. A second message context of a second message, input using a messaging application on the second computing device is determined to be distinct from the first message context. For example, the second message may be generated as a text message without an indication that it should be translated by a text-to-voice application when received at the first computing device. Based on the determination that the contexts of the two messages are distinct, the second message is modified to enable the second message to be perceived when received at the first computing device based on the first message context. For example, the second message may be modified to include instructions to automatically translate the message through a text-to-voice application when received at the first computing device.

These techniques solve the problems of other approaches described above. In particular, these techniques include a detectable context paired with a message such that when a message is received the recipient can perceive the context and draft a response that corresponds to the context. Additionally, when multiple devices are communicatively coupled, alternative transmitting devices are recommended based on message context to ensure a received message can be adequately perceived relative to the context and can keep the conversation flowing. Thus, the approaches described in the disclosure enable participants in a conversation to perceive the context of a sender's current conditions to enable messages to be formatted to enable continued perception by the recipients without interruption. By continuously monitoring the messages received and transmitted in the chain of communication to ascertain a context, as opposed to relying on the direct inputs corresponding to draft messages, messages can be seamlessly converted through a single interface, and devices can be changed to enable continuous communication.

In some embodiments, a flag is associated with the first message. The flag indicates to the second device the context of the first message. For example, the flag may include metadata, a font color change, or some other format such that when the message is received and processed by the second computing device, the context can be readily extracted and determined.

In some embodiments, the first message consists of a string of characters with specific formatting criteria. For example, some voice-to-text interfaces capitalize certain words depending on the position of the word in a sentence or phonetically spell words as opposed to spelling the word based on a dictionary spelling. The context of the message may be determined based on the formatting criteria and may be used to determine a modification for a second message to transmit from the second computing device to the first computing device.

In some embodiments, a plurality of devices communicatively coupled to the second computing device is identified. Based on the context of the first message, either the second device or one of the plurality of communicatively coupled devices is recommended to transmit the message to the first computing device. For example, the first message may have been generated using a voice-to-text translation application. The context from that message may lead to a modification to transmit the second message such that when it is received by the first computing device, there is an indication to the first computing device to communicate the message by a text-to-voice application. Certain devices, such as the second computing device, may not have the ability to incorporate that indication into the second message, while a device communicatively coupled to the second device may have that ability. Accordingly, the communicatively coupled device may be recommended to transmit the second message with the modification based on the context.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 12:
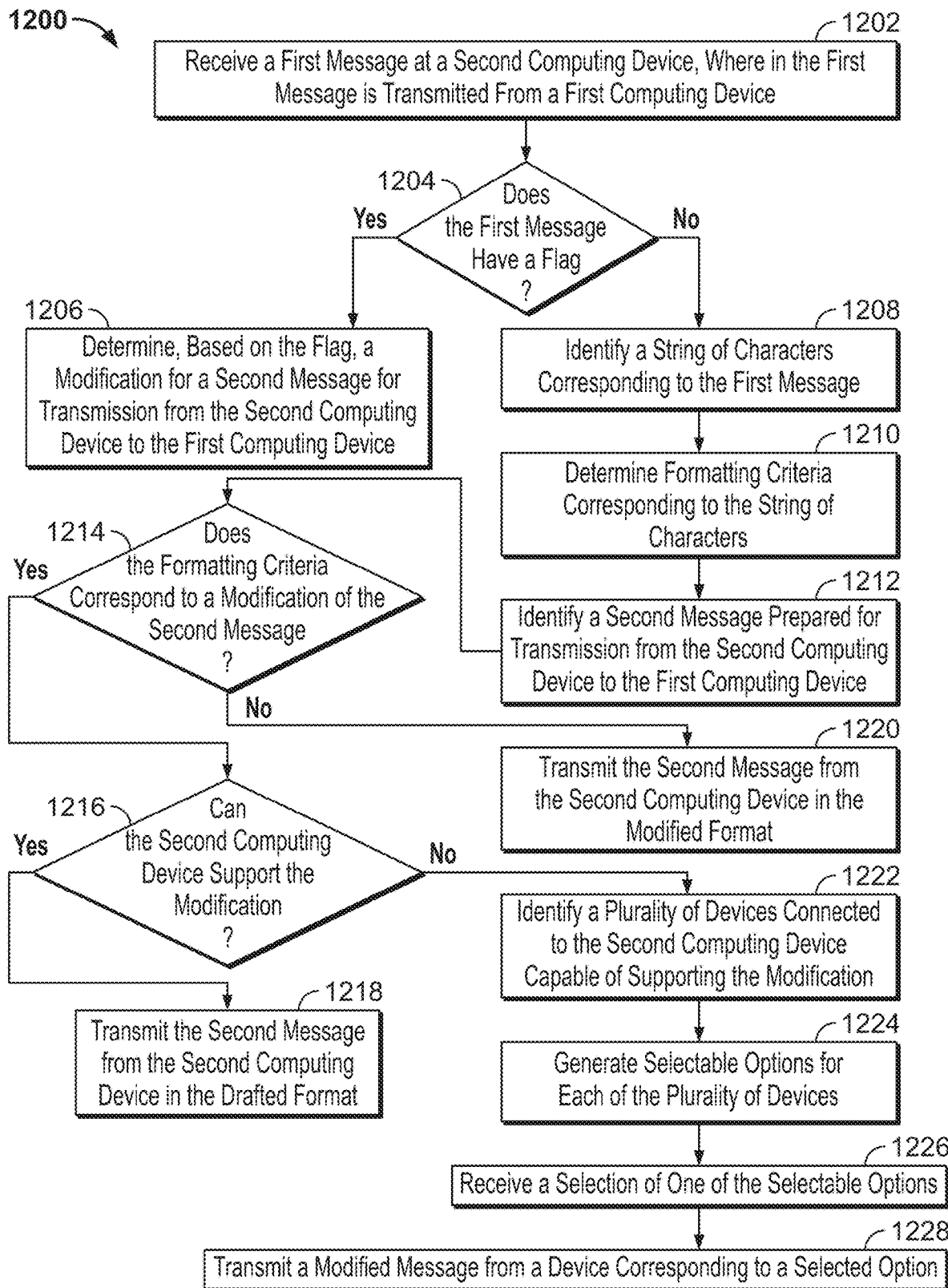
Figure 13:
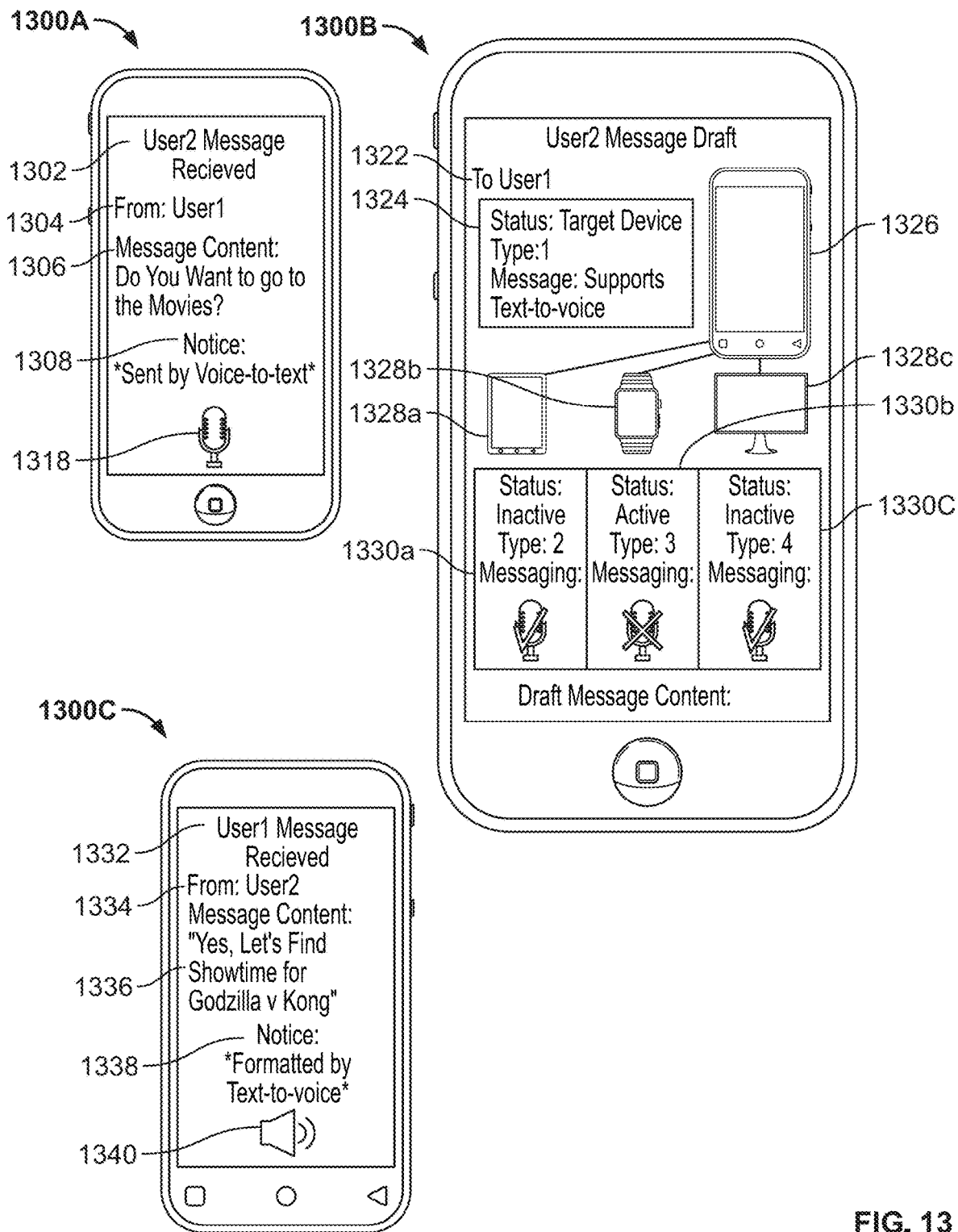

FIG. 12 is a flowchart representing an illustrative process for recommending a device of a plurality of communicatively coupled devices to transmit a second message based on a context of a first message, in accordance with some embodiments of the disclosure; and FIG. 13 is an illustrative example of an interactive messaging interface with options generated based on a context of a first message, in accordance with some embodiments of the disclosure.

DETAILED DESCRIPTION

Methods and systems are provided herein for modifying the format of messages transmitted between a first computing device and a second computing device based on a determination of the context of the messages transmitted between the first and second computing devices. The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

Figure 1:
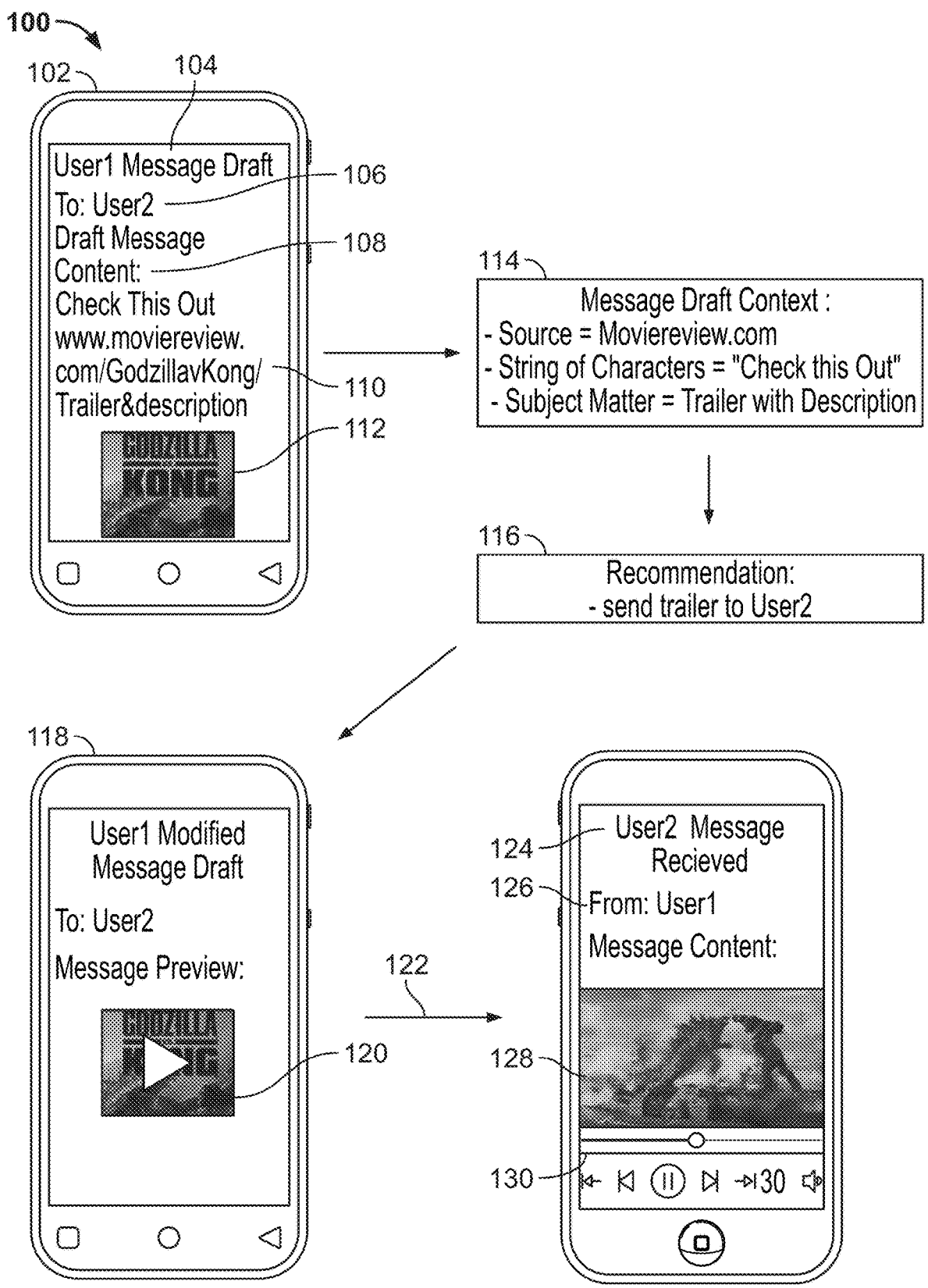
FIG. 1 is an example scenario in which a message is modified based on a reference included in the message and a context of the message, in accordance with some embodiments of the disclosure.

FIG. 1 depicts an example scenario in which a message is modified based on a reference included in the message and a context of the message, in accordance with some exemplary embodiments. In some embodiments, one or more parts of or the entirety of the system are configured as a system implementing various features, processes, and components of FIGS. 2-13. Although FIG. 4 shows a certain number of components, in various examples, the interactive system may include fewer than the illustrated number of components and/or multiples of one or more of the illustrated number of components.

Message modification scenario 100 depicts computing device 102. Computing device 102 may be represented by computing device 402 of FIG. 4. Input into computing device 102 is message draft 104, which represents a message a first user (e.g., USER1) intends to send to a second user (e.g., USER2). Recipient identifier 106 represents a field populated while creating message draft 104, which identifies a second computing device to receive the message (e.g., a mobile device corresponding to USER2). Message content field 108 represents a field in an interactive messaging application available on computing device 102 that enables a user of computing device 102 to populate with message content for a message intended to be transmitted to a second computing device. In some embodiments, message content field 108 includes at least one of a string of characters, a reference to a website uniform resource locator such as website reference 110, a reference to an application, a reference to content from a database accessible through an application, and a preview of subject matter available through the reference such as preview thumbnail 112.

Message draft context 114 indicates an identified source of subject matter in message draft 104, a string of characters populating message content field 108, and the subject matter that populates the message content field with the string of characters. Based on message draft context 114, modification recommendation 116 is used to create modified message draft 118 for a user to view in a messaging application before transmitting the message to a second computing device. Message preview 120 includes the identified subject matter from website reference 110 (e.g., a video trailer for a movie). In some embodiments, the subject matter is available as an embedded file that can be extracted and placed in a message drafted in a messaging application, such as a video file, or the subject matter is portions of the information available through the reference, such as a list of actors in a movie, ratings, reviews, or other descriptive information that can be pulled from the reference either directly, or through metadata available through or in the reference, and placed in the message draft. In some embodiments, a context is extracted, based on the chain of conversation between devices, to identify and focus aspects of the modification to pair the available subject matter in the reference with the flow of the chain of communication.

In some embodiments, message draft context 114 can include at least context ascertained from words and phrases identified from strings of characters in the text message and/or earlier messages in a chain of communication as identified by at least the sender and receiver of the present message (e.g., group messages involving these users may be included or excluded depending on a collective analysis of message related information. Additionally, message draft context 114 can be determined by checking whether a hyperlink is associated with a domain name, uniform resource locator, or application that is on a predetermined list or a list that may be updated manually or automatically based on user preferences or user favorites, which consists of a list of references that should be reformatted (e.g., movie reviews from a particular movie review application and the corresponding website). Message draft context 114 can further consist of a determination of whether the message was one of a speech-to-text translation or a text-to-speech translation. Attributes of the first and second devices may also be considered as part of message draft context 114.

Modified draft 118 is formatted at least in part by message draft context 114 and the aspects of this disclosure previously discussed, as well as other aspects present in the figures and remaining disclosure. The modification can consist of selectively extracting one or more segments of content from a webpage pointed to by a hyperlink in the message, and generating, based on the extracted segment or segments, a modified message including embedded content accessible from within a messaging application being used to generate and transmit the message.

Once modified message draft 118 is ready to be transmitted, it is sent through communication stream 122 as a message to a second computing device (e.g., a mobile device associated with recipient identifier 106). When the message is received at the second computing device, as indicated by notice 124, sender identifier 126 is presented for display along with message content 128, which corresponds to the subject matter of message preview 120 (e.g., an embedded video). Through a messaging application, the recipient of the message can access and manipulate message content 128 by interface 130 within the message application (e.g., a set of playback controls can be generated to enable a user to control playback of a video trailer corresponding to message content 128).

Figure 2:
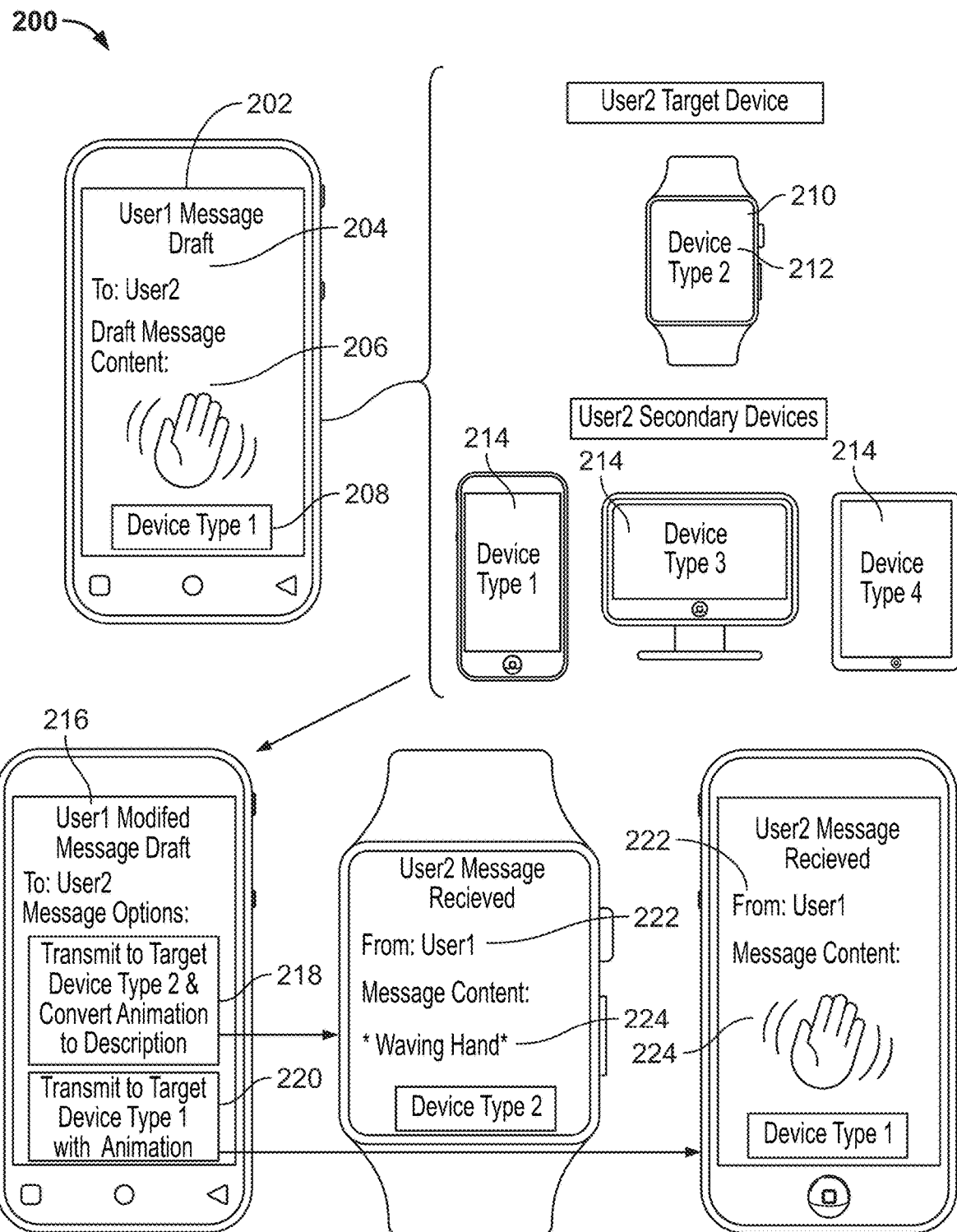
FIG. 2 is an example scenario in which a message on a first computing device is modified based on a device type of a second computing device, and the device types of devices communicatively coupled to the second computing device, in accordance with some embodiments of the disclosure.

FIG. 2 depicts an example scenario in which a message on a first computing device is modified based on a device type of a second computing device and the device types of devices communicatively coupled to the second computing device, in accordance with some exemplary embodiments. In some embodiments, one or more parts of or the entirety of the system is configured as a system implementing various features, processes, and components of FIGS. 1, and 3-13. Although FIG. 4 shows a certain number of components, in various examples, the interactive system may include fewer than the illustrated number of components and/or multiples of one or more of the illustrated number of components.

Message modification scenario 200 depicts computing device 202. Computing device 202 may be represented by computing device 402 of FIG. 4. A message draft is generated through a messaging application available on computing device 202 and includes recipient identifier 204 (e.g., USER2), which is used to identify a plurality of devices available to receive a transmitted message. Message content field 206 represents a field in an interactive messaging application available on computing device 202 that enables a user of computing device 202 to populate with message content for a message intended to be transmitted to a second computing device. In some embodiments, message content field 206 includes at least one of a string of characters, a reference to a website uniform resource locator, a reference to an application, a reference to content from a database accessible through an application, and a preview of subject matter available through the reference such as an animation preview for an animated image (e.g., a waving hand animation). Device type indicator 208 represents a device type for computing device 202 which will be compared against the device types of devices associated with the recipient (e.g., USER2).

Based on recipient identifier 204, target device 210 is identified as a currently active and available device to receive a transmission of a message from computing device 202. Target device 210 is associated with device type indicator 212, which indicates a device type of target device 210 (e.g., Device Type 2). Additionally, secondary devices 214 communicatively coupled to target device 210 are identified. In some embodiments, the secondary devices are identified based on respective locations of each secondary device to the target device. For example, target devices can often detect a location of detected devices by a number of methods including strength of communication signals and applications that report physical locations of devices. In some embodiments, the secondary devices are identified by a user profile that may authorize access to preference settings through multiple devices by having a user enter credentials on each respective device. The availability of devices may be determined based on one of a profile and a locator application or a combination thereof. Each of secondary devices 214 has its own device type indicator (e.g., Device Type 1, Device Type 3, and Device Type 4 which can represent any one of a mobile phone device, a personal computing device, a tablet device, or a smart watch). Secondary devices 214 may be connected to target device 210 by a local network that consists of a device-to-device connection enabling a user to perceive inputs on any or all of the devices simultaneously (e.g., all devices are in the same space, building, or room).

In some embodiments, the detection of secondary devices is based on proximity threshold. For example, in order for devices to be shown as available as alternative receiving or sending devices, they must be within a specific distance of a target device. In some embodiments, the proximity threshold may be adjusted by the user (e.g., within two feet because they are in a car or ten feet because they recognize all their devices are within the same room). In some embodiments, the proximity threshold may be determined based on signal strength for the communication stream between the target device and the secondary devices. For example, a message of a particular complexity (e.g., a message with an embedded video) may require a particular bandwidth to be transmitted to a secondary device. Depending on the available signal strength relative to the complexity of the drafted message, secondary devices may be identified. Additionally, the signal strength may be a function of proximity and can be utilized to determine if the secondary device is within a particular distance from the target device (e.g., a device is in an upstairs room and there is interference between floors of the building preventing establishing a local network connection between the upstairs device and the target device). Based on the identification of target device 210, secondary devices 214, and a comparison of each respective device type of target device 210, secondary devices 214, and computing device 202 to device type indicator 208, modified message draft 216 is generated.

Target device message option 218 is generated based on the identification of target device 210 as being a device active and readily available to the user corresponding to recipient identifier 204. Target device message option 218 may be a modification of the original content entered in message content field 206 if it is determined that device type indicator 212 does not match device type indicator 208 (e.g., Device Type 2 and Device Type 1 are not the same, which means the original drafted content is not supportable by target device 210). Additionally, based on the identification of secondary devices 214 and a comparison of each of their respective device types to device type indicator 208, alternative message option 220 is generated. Alternative message option 220 may indicate to the user of computing device 202 that there is an alternative device among secondary devices 214 that can receive the subject matter of message content field 206 without modification.

Once either target device message option 218 or alternative message option 220 is selected, the selected message option is transmitted to the corresponding device. At the corresponding destination device, the user will see sender identifier 222 (e.g., USER1) corresponding to an identifier associated with computing device 202. Depending on which device receives which option of the messaging options, the recipient will also see the version of message content 224 corresponding to the device type.

Figure 3:
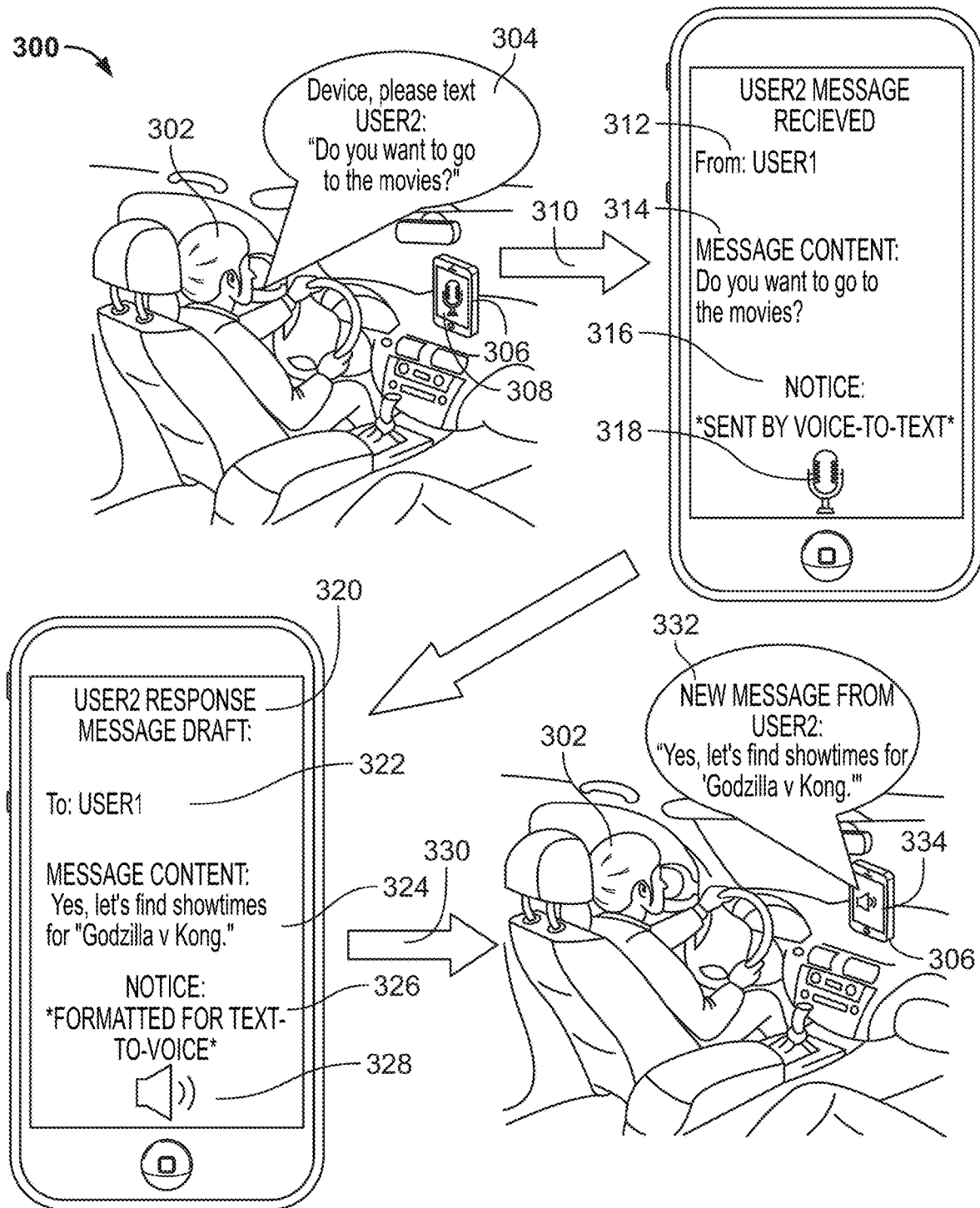
FIG. 3 is an example scenario in which a second message is modified based on a context corresponding to a first message, in accordance with some embodiments of the disclosure.
Figure 4:
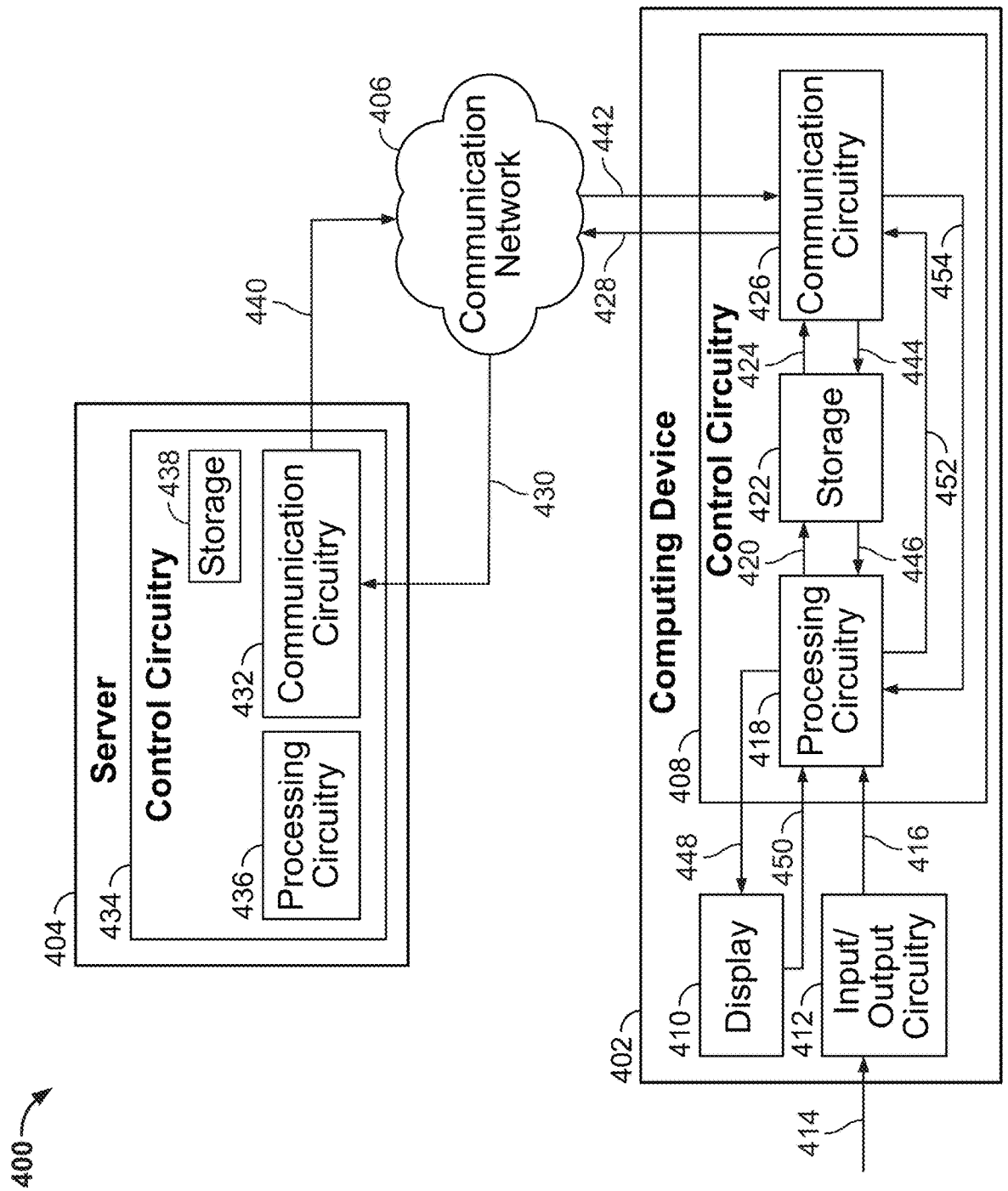
FIG. 4 is a block diagram representing an example message modification and transmission system, in accordance with some embodiments of the disclosure.

FIG. 3 depicts an example scenario in which a second message is modified based on a context corresponding to a first message, in accordance with some exemplary embodiments. In some embodiments, one or more parts of or the entirety of the system is configured as a system implementing various features, processes, and components of FIGS. 1, 2, and 4-13. Although FIG. 4 shows a certain number of components, in various examples, the interactive system may include fewer than the illustrated number of components and/or multiples of one or more of the illustrated number of components.

Message modification scenario 300 depicts user 302 providing message request 304. Message request 304 may be based on a voice-based command for a voice-to-text translation application for a messaging application. Message request 304 may include a command phrase as well as a recipient identifier (e.g., USER2) and a string of characters comprising the message. Based on the structure of message request 304, computing device 306 (which may be represented by computing device 402 of FIG. 4) indicates by translation icon 308 that message request 304 will be processed through a translation application such as the voice-to-text translation application for the messaging application being used to transmit the message.

The recipient of the translated message corresponding to message request 304 receives at a second computing device (which also may be represented by computing device 402 of FIG. 4) sender identifier 312, which indicates who the sender is (e.g., USER1) with message content 314 (e.g., "Do you want to go to the movies?") as well as notice 316 coupled with icon 318. Notice 316 notifies the recipient that the message was sent by a particular translation application, and icon 318 corresponds to the type of translation application so the recipient may readily identify the context of the message just received. Icon 318 may correspond to translation icon 308, depending on the applications being used as the sending and receiving computing devices, respectively. Transmission path 310 indicates the transmission of message request 304 to the recipient computing device.

The recipient generates responsive message draft 320 to continue the chain of communication and provide a response to message content 316 as provided by the sender (e.g., USER1). To establish or maintain the chain of communication, responsive message draft 320 includes responsive recipient identifier 322 (e.g., USER1) to frame at least in part the context of responsive message draft 320. Responsive message content 324 includes at least a string of characters (e.g., "Yes, let's find showtimes for 'Godzilla v Kong.'"). Notice 326 indicates, based on a context extracted from message content 314, notice 316, and translation icon 318, a responsive translation of the message will be executed (e.g., the message will be formatted for text-to-voice such that it is perceived by the recipient USER1 as a voice message). Translation icon 328 indicates the type of translation application so the recipient may readily identify the context of the message just received.

Transmission path 330 indicates the transmission of responsive message content 324 to computing device 306. User 302 is able to receive and perceive responsive message content 324 by message broadcast 332 (e.g., message content 324 is presented and played as an audio file for user 302 to perceive through computing device 306). Icon 334 may be generated for user 302 to see and can act as a flag for computing device 306 to understand the context of the chain of communication between user 302 and the first recipient corresponding to the second computing device. Icon 334 may correspond to translation icon 328, depending on the applications being used as the sending and receiving computing devices.

In some embodiments, the process described is replicated on both a first computing device sending a first message and a second device sending a responsive message to the first device. Each device would conduct the described analysis via the described interfaces in each direction for each received message. The analysis and interfaces would change depending on the sending and receiving of messages. For example, if it is determined that a first computing device is no longer sending messages using a voice-to-text translation application (e.g., the user has stopped driving and is electing to manually type responses), then the interface previously generated on the recipient's device would no longer be available, indicating that the message exchange may continue in a different format as the context is no longer as pertinent.

FIG. 4 depicts a block diagram representing exemplary message modification and transmission system 400, in accordance with some exemplary embodiments. The system is shown to include computing device 402, server 404, and a communication network 406. It is understood that while a single instance of a component may be shown and described relative to FIG. 4, additional instances of the component may be employed. For example, server 404 may include, or may be incorporated in, more than one server. Similarly, communication network 406 may include, or may be incorporated in, more than one communication network. Server 404 is shown communicatively coupled to computing device 402 through communication network 406. While not shown in FIG. 4, server 404 may be directly communicatively coupled to computing device 402, for example, in a system absent or bypassing communication network 406.

Communication network 406 may include one or more network systems, such as, without limitation, Internet, LAN, Wi-Fi or other network systems suitable for audio processing applications. In some embodiments, the system of FIG. 4 excludes server 404, and functionality that would otherwise be implemented by server 404 is instead implemented by other components of the system depicted by FIG. 4, such as one or more components of communication network 406. In still other embodiments, server 404 works in conjunction with one or more components of communication network 406 to implement certain functionality described herein in a distributed or cooperative manner. Similarly, in some embodiments, the system depicted by FIG. 4 excludes computing device 402, and functionality that would otherwise be implemented by computing device 402 is instead implemented by other components of the system depicted by FIG. 4, such as one or more components of communication network 406 or server 404 or a combination of the same. In other embodiments, computing device 402 works in conjunction with one or more components of communication network 406 or server 404 to implement certain functionality described herein in a distributed or cooperative manner.

Computing device 402 includes control circuitry 408, display 410 and input/output circuitry 412. Control circuitry 408 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 408 in turn includes communication circuitry 426, storage 422 and processing circuitry 418. In some embodiments, computing device 402 or control circuitry 408 may be configured as varying embodiments, or combinations of varying embodiments, of message modification scenario 100 of FIG. 1, message modification scenario 200 of FIG. 2 and message modification scenario 300 of FIG. 3 all configured to execute the various methods as well as incorporate the various features, processes, and interfaces depicted in FIGS. 5-13.

In addition to control circuitry 408 and 434, computing device 402 and server 404 may each include storage (storage 422, and storage 438, respectively). Each of storages 422 and 438 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 422 and 438 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 422 and 438 or instead of storages 422 and 438. In some embodiments, a user profile and messages corresponding to a chain of communication may be stored in one or more of storages 422 and 438.

In some embodiments, control circuitry 408 and/or 434 executes instructions for an application stored in memory (e.g., storage 422 and/or storage 438). Specifically, control circuitry 408 and/or 434 may be instructed by the application to perform the functions discussed herein. In some implementations, any action performed by control circuitry 408 and/or 434 may be based on instructions received from the application. For example, the application may be implemented as software or a set of executable instructions that may be stored in storage 422 and/or 438 and executed by control circuitry 408 and/or 434. In some embodiments, the application may be a client/server application where only a client application resides on computing device 402, and a server application resides on server 404.

The application may be implemented using any suitable architecture. For example, it may be a stand-alone application wholly implemented on computing device 402. In such an approach, instructions for the application are stored locally (e.g., in storage 422), and data for use by the application is downloaded on a periodic basis (e.g., from an out-of-band feed, from an Internet resource, or using another suitable approach). Control circuitry 408 may retrieve instructions for the application from storage 422 and process the instructions to perform the functionality described herein. Based on the processed instructions, control circuitry 408 may determine a type of action to perform in response to input received from input/output circuitry 412 or from communication network 406. For example, in response to either a first or second computing device receiving a message from either the first or second computing device, control circuitry 408 may perform the steps of message modification process 500 (FIG. 5), message modification process 600 (FIG. 6), message modification process 800 (FIG. 8), message modification process 900 (FIG. 9), message modification process 1100 (FIG. 11), message modification process 1200 (FIG. 12) or processes relative to various embodiments, as depicted by but not limited to message modification scenario 100 of FIG. 1, message modification scenario 200 of FIG. 2, and message modification scenario 300 of FIG. 3 including the various processes depicted in or carried out through FIGS. 7, 10, and 13.

In client/server-based embodiments, control circuitry 408 may include communication circuitry suitable for communicating with an application server (e.g., server 404) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 406). In another example of a client/server-based application, control circuitry 408 runs a web browser that interprets web pages provided by a remote server (e.g., server 404). For example, the remote server may store the instructions for the application in a storage device. The remote server may process the stored instructions using circuitry (e.g., control circuitry 434) and/or generate displays. Computing device 402 may receive the displays generated by the remote server and may display the content of the displays locally via display 410. This way, the processing of the instructions is performed remotely (e.g., by server 404) while the resulting displays, such as the display windows described elsewhere herein, are provided locally on computing device 404. Computing device 402 may receive inputs from the user via input/output circuitry 412 and transmit those inputs to the remote server for processing and generating the corresponding displays. Alternatively, computing device 402 may receive inputs from the user via input/output circuitry 412 and process and display the received inputs locally, by control circuitry 408 and display 410, respectively.

Server 404 and computing device 402 may transmit and receive content and data such as media content via communication network 406. For example, server 404 may be a media content provider, and computing device 404 may be a smart television configured to download or stream media content, such as a live news broadcast, from server 404. Control circuitry 434, 408 may send and receive commands, requests, and other suitable data through communication network 406 using communication circuitry 432, 426, respectively. Alternatively, control circuitry 434, 408 may communicate directly with each other using communication circuitry 432, 426, respectively, avoiding communication network 406.

It is understood that computing device 402 is not limited to the embodiments and methods shown and described herein. In nonlimiting examples, computing device 402 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 402 receives user input 414 at input/output circuitry 412. For example, computing device 402 may receive a user input such as a user swipe or user touch. In some embodiments, computing device 402 is a media device (or player) configured as message modification scenario 100 of FIG. 1, message modification scenario 200 of FIG. 2, and/or message modification scenario 300 of FIG. 3 with the capability to execute any of the authentication methods described therein. It is understood that computing device 402 is not limited to the embodiments and methods shown and described herein.

User input 414 may be received from a user selection-capturing interface that is separate from device 402, such as a remote-control device, trackpad or any other suitable user movement-sensitive, audio-sensitive or capture devices, or as part of device 402, such as a touchscreen of display 410. Transmission of user input 414 to computing device 402 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, or any other suitable wireless transmission protocol. Input/output circuitry 312 may include a physical input port such as a 3.5 mm audio jack, RCA audio jack, USB port, ethernet port, or any other suitable connection for receiving audio over a wired connection, or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 418 may receive user input 414 from input/output circuitry 412 using communication path 416. Processing circuitry 418 may convert or translate the received user input 414 that may be in the form of audio data, visual data, gestures or movement to digital signals. In some embodiments, input/output circuitry 412 performs the translation to digital signals. In some embodiments, processing circuitry 418 (or processing circuitry 436, as the case may be) carries out disclosed processes and methods. For example, processing circuitry 418 or processing circuitry 436 may perform the steps of message modification process 500 (FIG. 5), message modification process 600 (FIG. 6), message modification process 800 (FIG. 8), message modification process 900 (FIG. 9), message modification process 1100 (FIG. 11), message modification process 1200 (FIG. 12) or processes relative to various embodiments, as depicted by but not limited to message modification scenario 100 of FIG. 1, message modification scenario 200 of FIG. 2, and message modification scenario 300 of FIG. 3 including the various processes depicted in or carried out through FIGS. 7, 10, and 13.

Processing circuitry 418 may provide requests to storage 422 by communication path 420. Storage 422 may provide requested information to processing circuitry 418 by communication path 446. Storage 422 may transfer a request for information to communication circuitry 426 which may translate or encode the request for information to a format receivable by communication network 406 before transferring the request for information by communication path 428. Communication network 406 may forward the translated or encoded request for information to communication circuitry 432, by communication paths 430.

At communication circuitry 432, the translated or encoded request for information, received through communication path 430, is translated or decoded for processing circuitry 436, which will provide a response to the request for information based on information available through control circuitry 434 or storage 438, or a combination thereof. The response to the request for information is then provided back to communication network 406 by communication path 440 in an encoded or translated format such that communication network 406 can forward the encoded or translated response back to communication circuitry 426 by communication path 442.

At communication circuitry 426, the encoded or translated response to the request for information may be provided directly back to processing circuitry 418 by communication path 454, or may be provided to storage 422 through communication path 444, which then provides the information to processing circuitry 418 by communication path 446. Processing circuitry 418 may also provide a request for information directly to communication circuitry 426 though communication path 452, where storage 426 responds to an information request, provided through communication path 420 or 444, by communication path 424 or 446 that storage 422 does not contain information pertaining to the request from processing circuitry 418.

Processing circuitry 418 may process the response to the request received through communication paths 446 or 454 and may provide instructions to display 410 for a notification to be provided to the users through communication path 448. Display 410 may incorporate a timer for providing the notification or may rely on inputs through input/output circuitry 412 from the user, which are forwarded through processing circuitry 418 through communication path 448, to determine how long or in what format to provide the notification. When display 410 determines the display has been completed, a notification may be provided to processing circuitry 418 through communication path 450.

The communication paths provided in FIG. 4 between computing device 402, server 404, communication network 406, and all subcomponents depicted are exemplary and may be modified to reduce processing time or enhance processing capabilities for each step in the processes disclosed herein by one skilled in the art.

Figure 5:
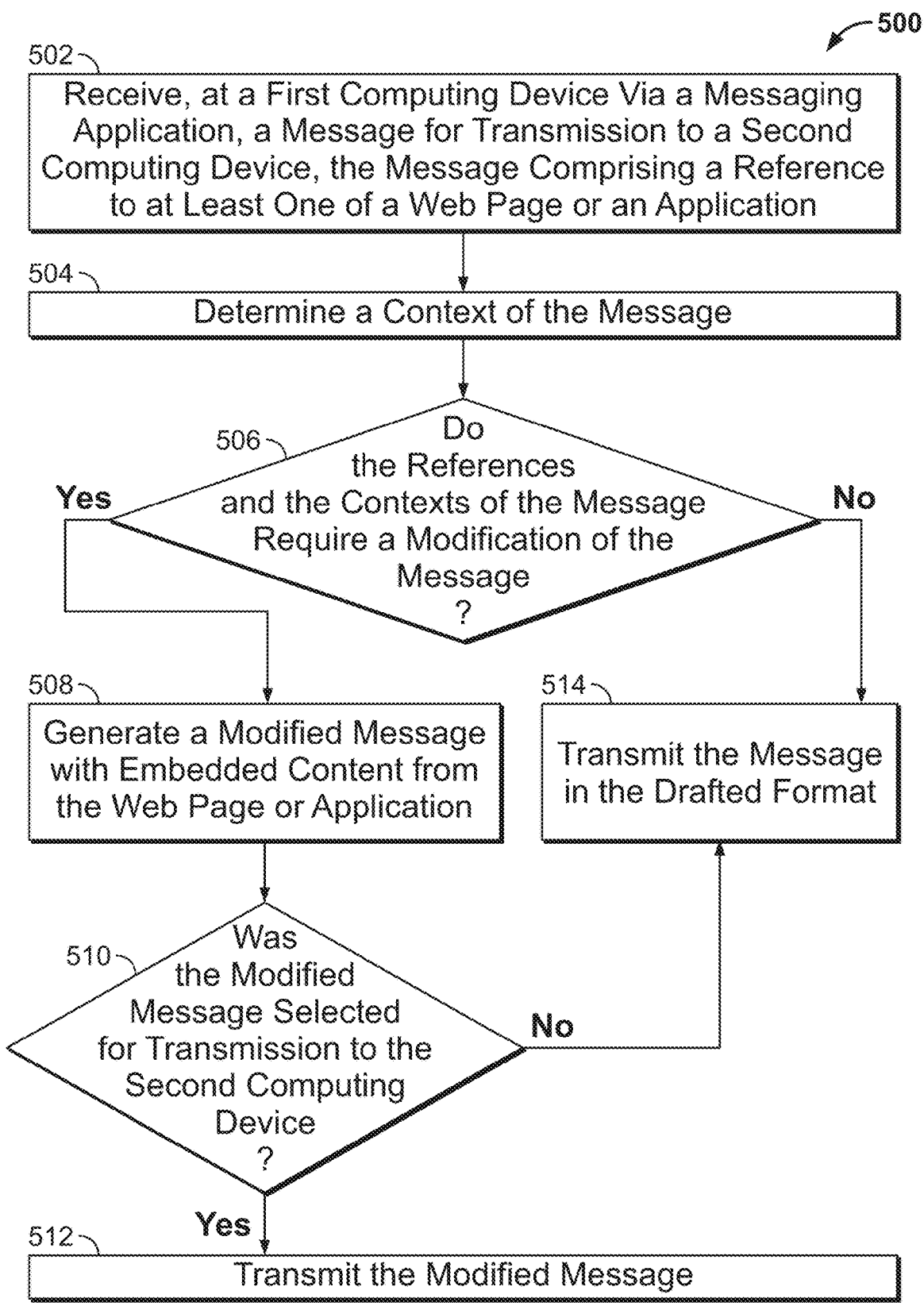
FIG. 5 is a flowchart representing an illustrative process for determining whether a modification of a message will be recommended based on a reference and a context, in accordance with some embodiments of the disclosure.

FIG. 5 depicts a flowchart representing an illustrative process for determining whether a modification of a message will be recommended based on a reference and a context, in accordance with some exemplary embodiments. In some embodiments, one or more parts of or the entirety of the system is configured as a system implementing various features, processes, and components of FIGS. 1-4 and 6-13. Although FIG. 4 shows a certain number of components, in various examples, the interactive system may include fewer than the illustrated number of components and/or multiples of one or more of the illustrated number of components.

It should be noted that the process depicted in FIG. 5 or any step thereof could be performed on, or provided by, any device shown in FIG. 4 and can incorporate various user interfaces (e.g., on display 410 of FIG. 4). For example, the process depicted in FIG. 5 may be executed by control circuitry 408 (FIG. 4) of user equipment exemplified by computing device 402. In addition, one or more steps of the process depicted in FIG. 5 may be incorporated into or combined with one or more steps of any other process or embodiment (e.g., starting at process block 602 in message modification process 600 of FIG. 6, starting at process block 802 in message modification process 800 of FIG. 8, starting at process block 902 in message modification process 900 of FIG. 9, starting at process block 1102 in message modification process 1100 of FIG. 11, starting at process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 7, 10, and 13). In addition, FIGS. 1-3 provide depictions of exemplary embodiments of the processes described herein as executed by message modification and transmission system 400.

At 502, a message for transmission to a second computing device is received. The message comprises a reference to at least one of a web page or an application. At 504, the context of the message is determined. If it is determined that the reference and the context of the message require a modification of the message (YES at 506), a modified message with embedded content from the webpage or application is generated at 508. If it is determined that the reference and the context of the message do not require a modification of the message (NO at 506), the message is transmitted in the drafted format at 514. If it is determined that the modified message was selected for transmission to the second computing device (YES at 510), the modified message is transmitted to the second computing device at 512. If it is determined that the modified message was not selected for transmission to the second computing device (NO at 510), the message is transmitted in the drafted format at 514.

Figure 6:
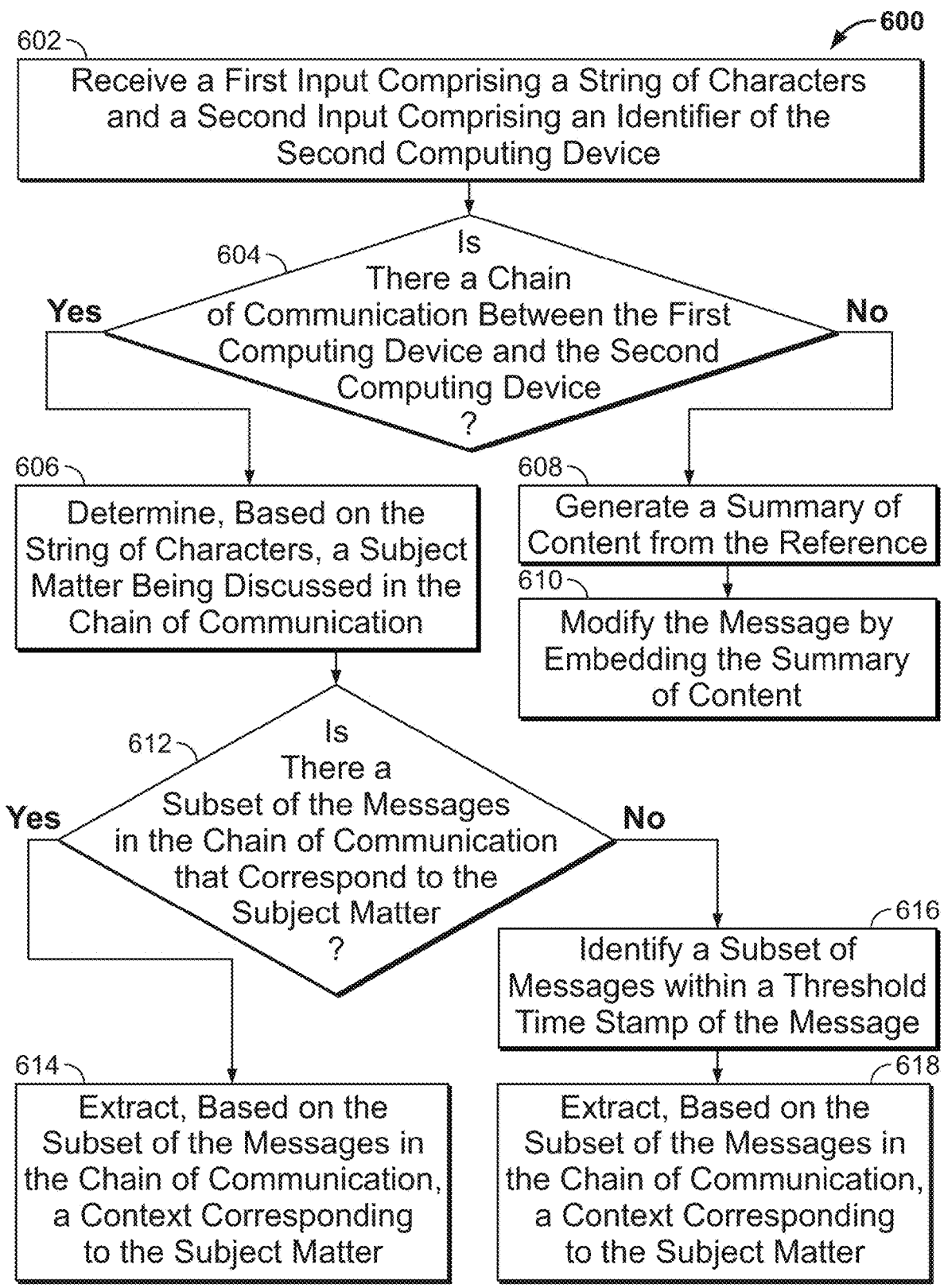
FIG. 6 is a flowchart representing an illustrative process for determining a context of a message, in accordance with some embodiments of the disclosure.

FIG. 6 depicts a flowchart representing an illustrative process for determining a context of a message, in accordance with some exemplary embodiments. In some embodiments, one or more parts of or the entirety of the system is configured as a system implementing various features, processes, and components of FIGS. 1-5 and 7-13. Although FIG. 4 shows a certain number of components, in various examples, the interactive system may include fewer than the illustrated number of components and/or multiples of one or more of the illustrated number of components.

It should be noted that the process depicted in FIG. 6 or any step thereof could be performed on, or provided by, any device shown in FIG. 4 and can incorporate various user interfaces (e.g., on display 410 of FIG. 4). For example, the process depicted in FIG. 6 may be executed by control circuitry 408 (FIG. 4) of user equipment exemplified by computing device 402. In addition, one or more steps of the process depicted in FIG. 6 may be incorporated into or combined with one or more steps of any other process or embodiment (e.g., starting at process block 502 in message modification process 500 of FIG. 5, starting at process block 802 in message modification process 800 of FIG. 8, starting at process block 902 in message modification process 900 of FIG. 9, starting at process block 1102 in message modification process 1100 of FIG. 11, starting at process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 7, 10, and 13). In addition, FIGS. 1-3 provide depictions of exemplary embodiments of the processes described herein as executed by message modification and transmission system 400.

At 602, a first input that consists of a string of characters and second input that consists of an identifier of the second computing device are received at a first computing device. If it is determined that there is a chain communication between the first computing device and the second computing device (YES at 604), a subject matter is determined as being discussed in the chain of communication based on the string of characters at 606. If it is determined that there is not a chain of communication between the first computing device and the second computing device (NO at 604), a summary of content from the reference is generated at 608 and the message is modified by embedding the summary of content in the message at 610.

If it is determined there is a subset of messages in the chain of communication that correspond to the subject matter identified at 606 (YES at 612), a context is extracted from the subset of messages corresponding to the subject matter at 614. The context may be used to modify the message. If it is determined there is not a subset of messages in the chain of communication that correspond to the subject matter identified at 606 (NO at 612), a subset of messages within a threshold time stamp of the message is identified and a context is extracted from the subset of messages at 618. The context may be used to modify the message. For example, the threshold time stamp might be within 24 hours of the time stamp of the drafted message. In some embodiments, the threshold may be manually adjusted by users of the messaging application, depending on how many days or how long of a period of time a user tends to maintain a conversation about a same subject matter.

Figure 7:
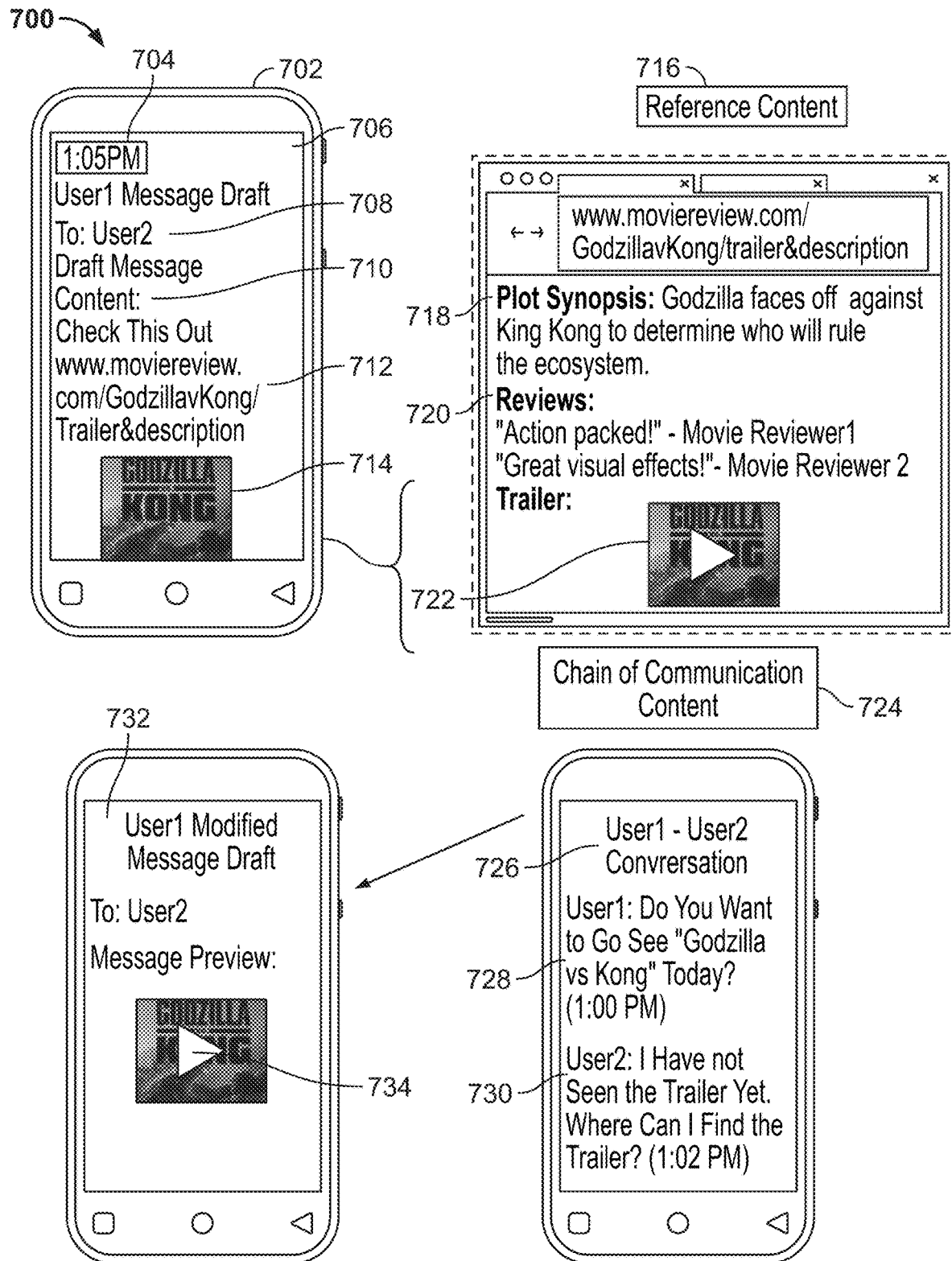
FIG. 7 is an illustrative example of a message being modified based on a reference in a message and a context of the message, in accordance with some embodiments of the disclosure.

FIG. 7 depicts an illustrative example of a message being modified based on a reference in a message and a context of the message, in accordance with some exemplary embodiments. In some embodiments, one or more parts of or the entirety of the system is configured as a system implementing various features, processes, and components of FIGS. 1-6 and 8-13. Although FIG. 4 shows a certain number of components, in various examples, the interactive system may include fewer than the illustrated number of components and/or multiples of one or more of the illustrated number of components.

It should be noted that the message modification depicted in FIG. 7 or any step thereof could be performed on, or provided by, any device shown in FIG. 4 and can incorporate various user interfaces (e.g., on display 410 of FIG. 4). For example, the message modification depicted in FIG. 7 may be executed by control circuitry 408 (FIG. 4) of user equipment exemplified by computing device 402. In addition, one or more steps of the message modification depicted in FIG. 7 may be incorporated into or combined with one or more steps of any other process or embodiment (e.g., starting at process block 502 in message modification process 502 of FIG. 5, starting at process block 602 in message modification process 600 of FIG. 6, starting at process block 802 in message modification process 800 of FIG. 8, starting at process block 902 in message modification process 900 of FIG. 9, starting at process block 1102 in message modification process 1100 of FIG. 11, starting at process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 10 and 13). In addition, FIGS. 1-3 provide depictions of exemplary embodiments of the processes described herein as executed by message modification and transmission system 400.

Message interface 700 involves computing device 702, which may be represented by computing device 402 of FIG. 4. Displayed on computing device 702 is time stamp 704, which may be used to identify a context of a message. Message draft 706 comprises receiving device identifier 708 and message content field 710 which is populated by reference content 712 and reference preview 714. Reference content 712 corresponds to reference content 716 which, when viewed in the appropriate application, includes details such as description 718, comments 720, and embedded video 722. Chain of communication content 724 is deciphered based on identifier 708 and is identified based on conversation identifier 726 which may include identifier 708. Chain of communication content 724 includes messages 726, 728, and 730 which each have subject matter and a time stamp relative to time stamp 704 for the purposes of identifying context. Based on reference content 712 and the content found in chain of communication content 724, modified message draft 732 is generated with embedded content 734 (e.g., an embedded video of the trailer found in reference content 712).

Figure 8:
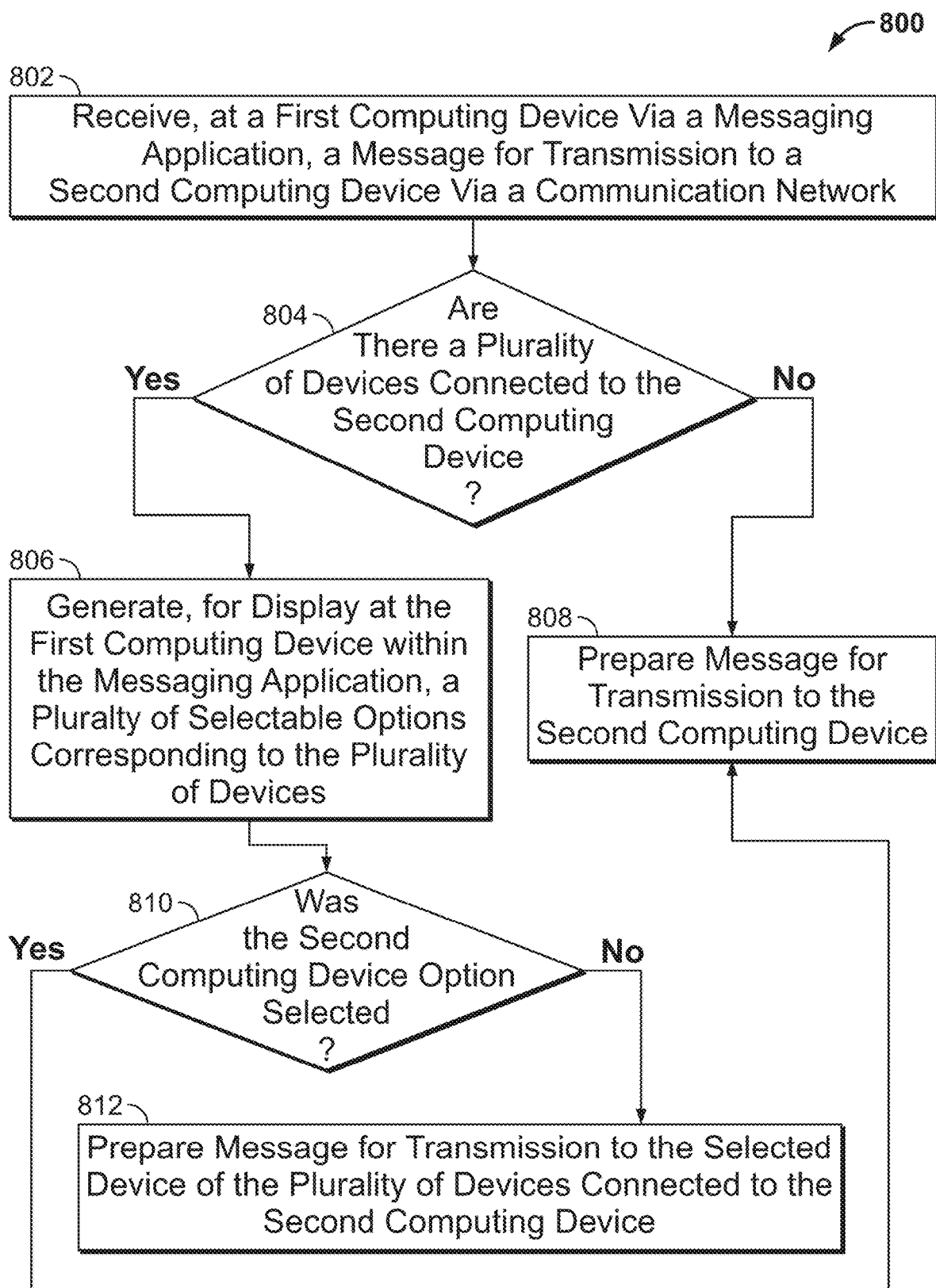
FIG. 8 is a flowchart representing an illustrative process for identifying a plurality of devices communicatively coupled to a computing device for determining which device to transmit a message from, in accordance with some embodiments of the disclosure.

FIG. 8 depicts a flowchart representing an illustrative process for identifying a plurality of devices communicatively coupled to a computing device for determining which device to transmit a message from, in accordance with some exemplary embodiments. In some embodiments, one or more parts of or the entirety of the system is configured as a system implementing various features, processes, and components of FIGS. 1-7 and 9-13. Although FIG. 4 shows a certain number of components, in various examples, the interactive system may include fewer than the illustrated number of components and/or multiples of one or more of the illustrated number of components.

It should be noted that the process depicted in FIG. 8 or any step thereof could be performed on, or provided by, any device shown in FIG. 4 and can incorporate various user interfaces (e.g., on display 410 of FIG. 4). For example, the process depicted in FIG. 8 may be executed by control circuitry 408 (FIG. 4) of user equipment exemplified by computing device 402. In addition, one or more steps of the process depicted in FIG. 8 may be incorporated into or combined with one or more steps of any other process or embodiment (e.g., starting at process block 502 in message modification process 500 of FIG. 5, starting at process block 602 in message modification process 600 of FIG. 6, starting at process block 902 in message modification process 900 of FIG. 9, starting at process block 1102 in message modification process 1100 of FIG. 11, starting at process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 7, 10, and 13). In addition, FIGS. 1-3 provide depictions of exemplary embodiments of the processes described herein as executed by message modification and transmission system 400.

At 802, a message for transmission to a second computing device through a communication network is received at a first computing device by a messaging application. If it is determined there are a plurality of devices connected to the second computing device (YES at 804), a plurality of selectable options corresponding to the connected devices is generated at the first computing device at 806. If it is determined there are not a plurality of devices connected to the second computing device (NO at 804), the message is prepared for transmission from the first computing device to the second computing device at 808. If the second computing device option is selected (YES at 810), the message is prepared for transmission from the first computing device to the second computing device at 808. If the second computing device option is not selected (NO at 810), a modified message is prepared for the selected device of the plurality of computing devices at 812.

Figure 9:
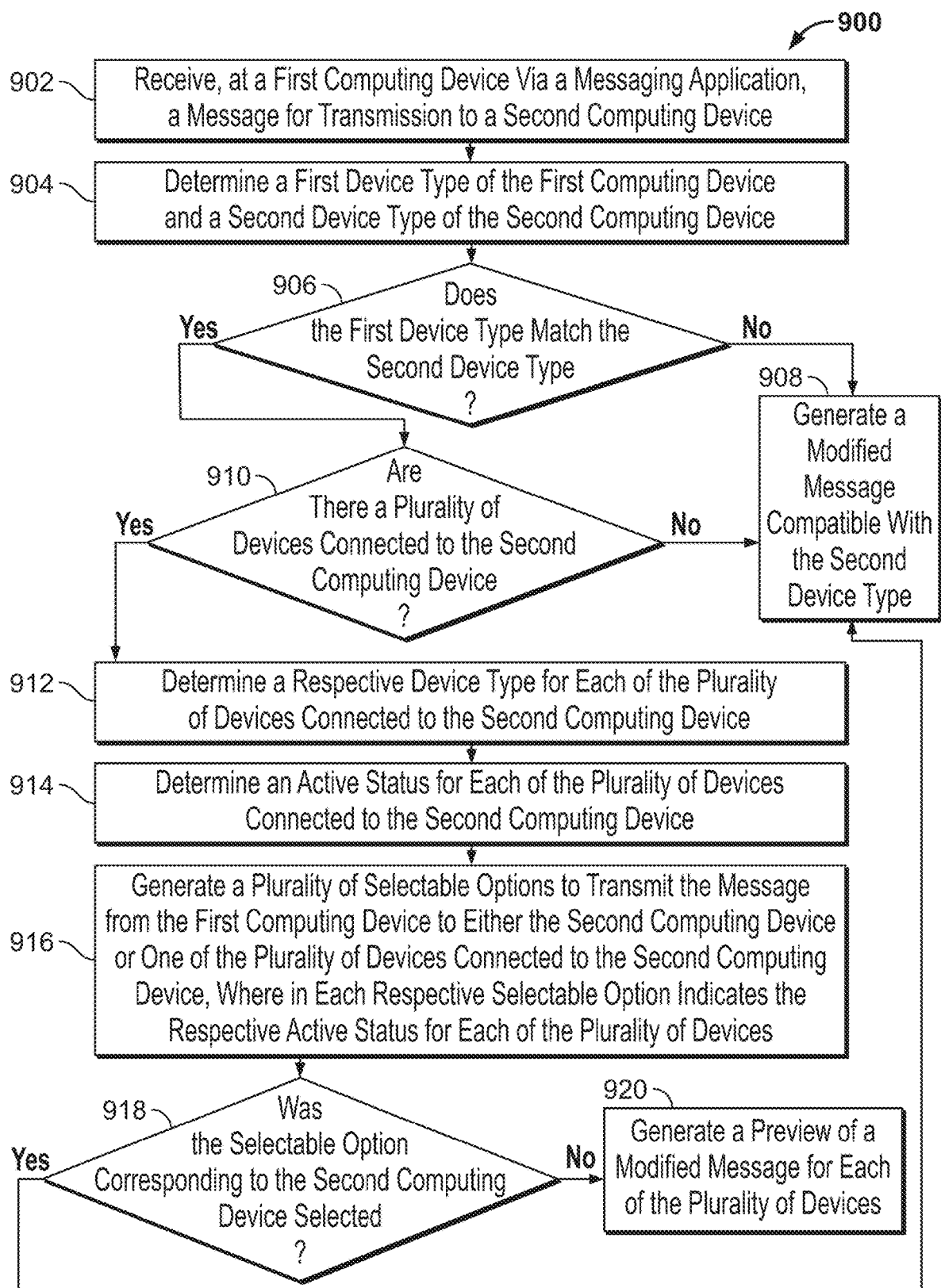
FIG. 9 is a flowchart representing an illustrative process for determining which of a plurality of communicatively coupled devices is recommended to transmit a message, in accordance with some embodiments of the disclosure.

FIG. 9 depicts a flowchart representing an illustrative process for determining which of a plurality of communicatively coupled devices is recommended to transmit a message, in accordance with some exemplary embodiments. In some embodiments, one or more parts of or the entirety of the system is configured as a system implementing various features, processes, and components of FIGS. 1-8 and 10-13. Although FIG. 4 shows a certain number of components, in various examples, the interactive system may include fewer than the illustrated number of components and/or multiples of one or more of the illustrated number of components.

It should be noted that the process depicted in FIG. 9 or any step thereof could be performed on, or provided by, any device shown in FIG. 4 and can incorporate various user interfaces (e.g., on display 410 of FIG. 4). For example, the process depicted in FIG. 9 may be executed by control circuitry 408 (FIG. 4) of user equipment exemplified by computing device 402. In addition, one or more steps of the process depicted in FIG. 5 may be incorporated into or combined with one or more steps of any other process or embodiment (e.g., starting at process block 502 in message modification process 500 of FIG. 5, starting at process block 602 in message modification process 600 of FIG. 6, starting at process block 802 in message modification process 800 of FIG. 8, starting at process block 1102 in message modification process 1100 of FIG. 11, starting at process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 7, 10, and 13). In addition, FIGS. 1-3 provide depictions of exemplary embodiments of the processes described herein as executed by message modification and transmission system 400.

At 902, a message for transmission to a second computing device through a communication network is received at a first computing device by a messaging application. At 904, a first device type of the first computing device and a second device type of the second device are determined. If it is determined that the first device type and the second device type match (YES at 906), a review of whether a plurality of devices are connected to the second computing device is conducted at 910. If it is determined that the first device type does not match the second device type (NO at 906), a modified message compatible with the second device type is generated at 908.

If it is determined that a plurality of device is connected to the second computing device (YES at 910), a respective device type for each of the plurality of devices connected to the second computing device is determined at 912. If it is determined that there is not a plurality of devices connected to the second computing device (NO at 910), a modified message compatible with the second device type is generated at 908.

At 914, an active status of each of the plurality of devices connected to the second computer device is determined. For example, some of the devices might be powered off but may be detected as being connected and therefore have an inactive status. At 916, a plurality of selectable options is generated for each of the plurality of connected computing devices. The selectable options indicate whether the device type is compatible, whether a modification of the message is required, and whether the secondary device is active. If it is determined that the selectable option corresponding to the second computing device is selected (YES at 918), a modified message compatible with the second device type is generated at 908. If it is determined that the selectable option corresponds to a device different from the second device (NO at 918), a preview of a modified message for each of the plurality of devices is generated at 920.

Figure 10:
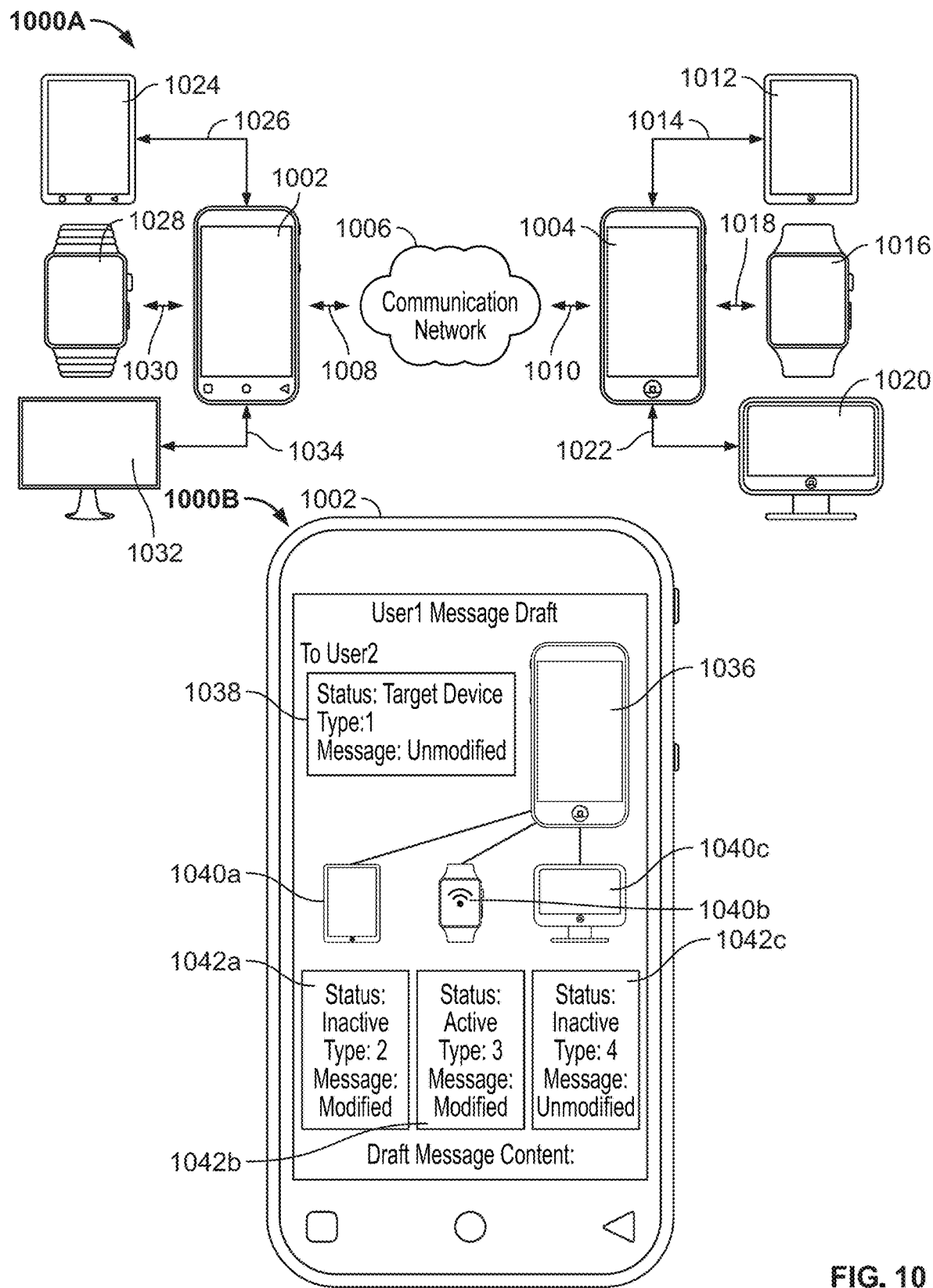
FIG. 10 is an illustrative example of a system of communicatively coupled devices and a selectable interface representing communicatively coupled devices that can be used to transmit a message, in accordance with some embodiments of the disclosure.

FIG. 10 depicts an illustrative example of a system of communicatively coupled devices and a selectable interface representing communicatively coupled devices that can be used to transmit a message, in accordance with some exemplary embodiments. In some embodiments, one or more parts of or the entirety of the system is configured as a system implementing various features, processes, and components of FIGS. 1-9 and 11-13. Although FIG. 4 shows a certain number of components, in various examples, the interactive system may include fewer than the illustrated number of components and/or multiples of one or more of the illustrated number of components.

It should be noted that the message modification and the system depicted in FIG. 10 or any step thereof could be performed on, or provided by, any device shown in FIG. 4 and can incorporate various user interfaces (e.g., on display 410 of FIG. 4). For example, the message modification and the system depicted in FIG. 10 may be executed by control circuitry 408 (FIG. 4) of user equipment exemplified by computing device 402. In addition, one or more steps of the message modification and the system depicted in FIG. 10 may be incorporated into or combined with one or more steps of any other process or embodiment (e.g., starting at process block 502 in message modification process 500 of FIG. 5, starting at process block 602 in message modification process 600 of FIG. 6, starting at process block 802 in message modification process 800 of FIG. 8, starting at process block 902 in message modification process 900 of FIG. 9, starting at process block 1102 in message modification process 1100 of FIG. 11, starting at process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 7 and 13). In addition, FIGS. 1-3 provide depictions of exemplary embodiments of the processes described herein as executed by message modification and transmission system 400.

Messaging system 1000A includes first computing device 1002, second computing device 1004, and communication network 1006, which serves as a transmission medium for messages between first computing device 1002 and second computing device 1004. First computing device 1002 sends and receives messages to and from communication network 1006 through communication stream 1008. Second computing device 1004 sends and receives messages to and from communication network 1006 through communication stream 1010. A first plurality of secondary devices includes secondary devices 1012, 1016, and 1020. Each of these secondary devices is communicatively coupled to second computing device 1004 through communication streams 1014, 1018, and 1022, respectively. Each of these devices corresponds to devices that would appear as alternative recipients of a message from first computing device 1002. A second plurality of secondary devices includes secondary devices 1024, 1028, and 1032. Each of these secondary devices is communicatively coupled to first computing device 1002 by communication streams 1026, 1030, and 1034, respectively. Each of communication streams 1014, 1018, 1022, 1026, 1030, and 1034 can be used to send or receive information, messages, or status (e.g., as described in the present disclosure) between each respective device.

Messaging interface 1000B includes first computing device 1002. It should be noted that messaging interface 1000B may be replicated at second computing device 1004. Target device icon 1036 corresponds to a receiving device associated with an identifier populated in a messaging application (e.g., second computing device 1004). Status icon 1038 displays an identifier of target device icon 1036 (e.g., "Target Device"), as well as a device type (e.g., "1"), and a status for the message that was drafted indicating whether it would need to be modified based at least on the device type (e.g., "unmodified"). Secondary devices 1012, 1016, and 1020 are represented by secondary device identifier icons 1040*a-c*. It should be noted that if messaging interface 1000B is generated for display on second computing device 1004 for a responsive message to a message provided by the first computing device, secondary device identifier icons 1040*a-c* may represent secondary devices 1024, 1028, and 1032, respectively. Each of secondary device identifier icons 1040*a-c* is paired with secondary device status icons 1042*a-c*, respectively, which mirror the format of status icon 1038.

Figure 11:
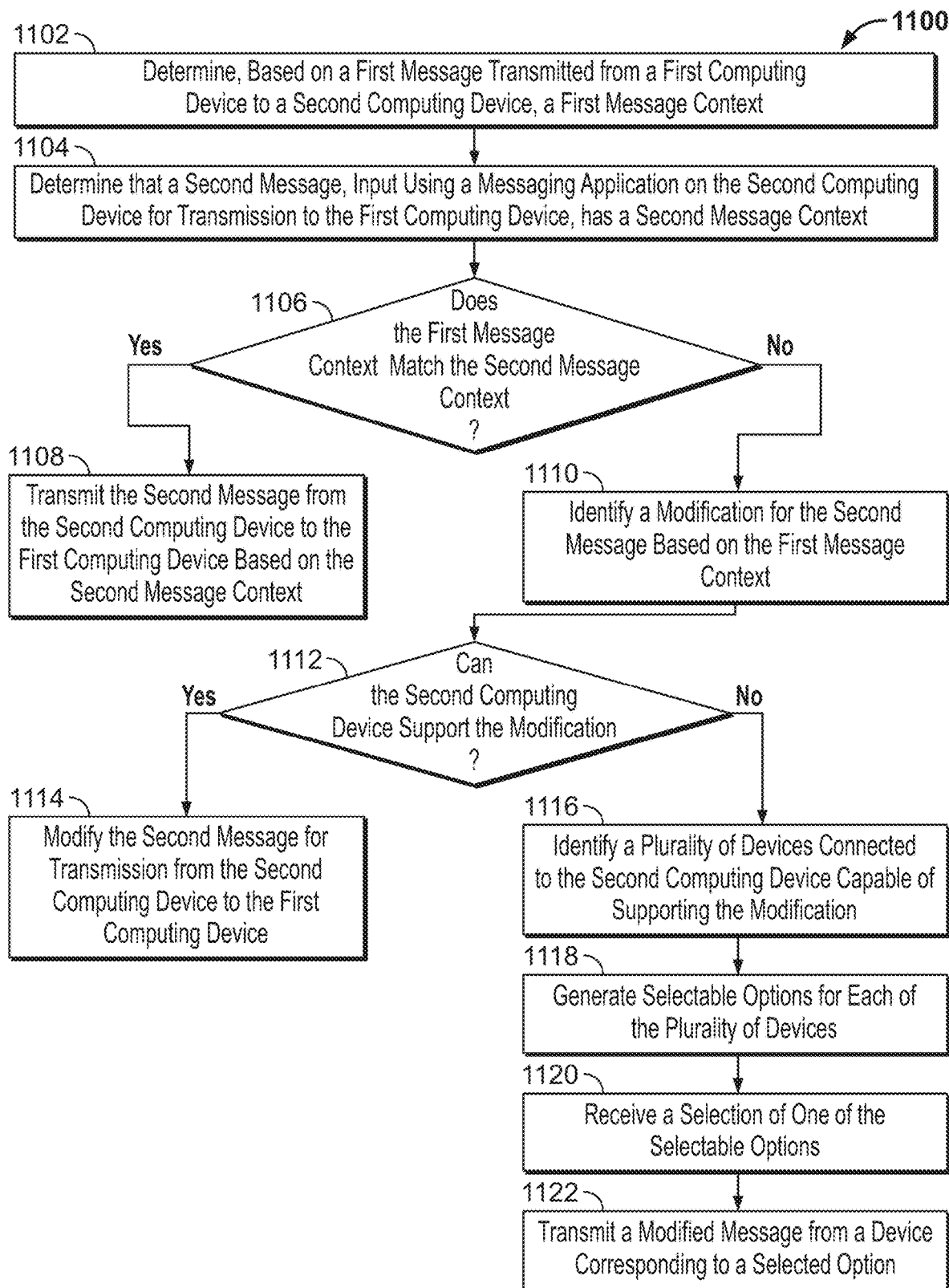
FIG. 11 is a flowchart representing an illustrative process for identifying a modification of a second message based on a context received with a first message, in accordance with some embodiments of the disclosure.

FIG. 11 depicts a flowchart representing an illustrative process for identifying a modification of a second message based on a context received with a first message, in accordance with some exemplary embodiments. In some embodiments, one or more parts of or the entirety of the system is configured as a system implementing various features, processes, and components of FIGS. 1-10, 12 and 13. Although FIG. 4 shows a certain number of components, in various examples, the interactive system may include fewer than the illustrated number of components and/or multiples of one or more of the illustrated number of components.

It should be noted that the process depicted in FIG. 11 or any step thereof could be performed on, or provided by, any device shown in FIG. 4 and can incorporate various user interfaces (e.g., on display 410 of FIG. 4). For example, the process depicted in FIG. 11 may be executed by control circuitry 408 (FIG. 4) of user equipment exemplified by computing device 402. In addition, one or more steps of the process depicted in FIG. 11 may be incorporated into or combined with one or more steps of any other process or embodiment (e.g., starting at process block 502 in message modification process 500 of FIG. 5, starting at process block 602 in message modification process 600 of FIG. 6, starting at process block 802 in message modification process 800 of FIG. 8, starting at process block 902 in message modification process 900 of FIG. 9, process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3 including the various processes depicted in or carried out through FIGS. 7, 10, and 13). In addition, FIGS. 1-3 provide depictions of exemplary embodiments of the processes described herein as executed by message modification and transmission system 400.

At 1102, a first message context of a first message transmitted from a first computing device to a second computing device is determined (e.g., the first message was sent using a voice-to-text translation application). At 1104, a second message context for a second message prepared to be transmitted from the second computing device to the first computing device is determined (e.g., the second message is responsive to the first message and may be prepared to be received as a text-to-voice message). If it is determined that the first message context matches the second message context (YES at 1106), the second message is transmitted to the first computing device based on the second message context at 1108. If it is determined that the second message context does not match the first message context (NO at 1106), a modification for the second message is identified based on the first message context at 1110.

If it is determined that the second computing device can support the identified modification (YES at 1112), the second message is modified for transmission from the second computing device to the first computing device at 1114. If it is determined that the second computing device cannot support the modification (NO at 1112), a plurality of secondary devices are identified at 1116. At 1118, a plurality of selectable options are generated at the second computing device corresponding to the plurality of secondary devices. At 1120, a selection of one of the options is received. At 1122, the modified message is transmitted from the device corresponding to the selected option.

FIG. 12 depicts a flowchart representing an illustrative process for recommending a device of a plurality of communicatively coupled devices to transmit a second message based on a context of a first message, in accordance with some exemplary embodiments. In some embodiments, one or more parts of or the entirety of the system is configured as a system implementing various features, processes, and components of FIGS. 1-11 and 13. Although FIG. 4 shows a certain number of components, in various examples, the interactive system may include fewer than the illustrated number of components and/or multiples of one or more of the illustrated number of components.

It should be noted that the process depicted in FIG. 12 or any step thereof could be performed on, or provided by, any device shown in FIG. 4 and can incorporate various user interfaces (e.g., on display 410 of FIG. 4). For example, the process depicted in FIG. 12 may be executed by control circuitry 408 (FIG. 4) of user equipment exemplified by computing device 402. In addition, one or more steps of the process depicted in FIG. 12 may be incorporated into or combined with one or more steps of any other process or embodiment (e.g., starting at process block 502 in message modification process 500 of FIG. 5, starting at process block 602 in message modification process 600 of FIG. 6, starting at process block 802 in message modification process 800 of FIG. 8, starting at process block 902 in message modification process 900 of FIG. 9, starting at process block 1102 in message modification process 1100 of FIG. 11 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 7, 10, and 13). In addition, FIGS. 1-3 provide depictions of exemplary embodiments of the processes described herein as executed by message modification and transmission system 400.

At 1202, a first message is received at a second computing device from a first computing device. If it is determined that the first message has a flag (YES at 1204), a modification for a second message being prepared at the second computing device to send to the first computing device is determined at 1206. If it is determined that the first message does not have a flag (NO at 1204), a string of characters corresponding to the first message is identified at 1208. At 1210, formatting criteria for the string of characters is determined. At 1212, a second message is identified for transmission to the first computing device from the second computing device. If it is determined that formatting criteria from the string of characters of the first message correspond to a modification of the second message (YES at 1214), a review of whether the second computing device can support the modification is determined at 1216. If it is determined that the criteria from the string of characters of the first message do not correspond to a modification of the second message (NO at 1214), the second message is transmitted from the second computing device in the drafted form at 1220.

If it is determined that the second computing device can support the modification (YES at 1216), the second message is transmitted from the second computing device in the modified format at 1218. If it is determined that the second computing device cannot support the modification (NO at 1216), a plurality of secondary devices is identified that can support the modification at 1222. At 1224, selectable options corresponding to the plurality of secondary devices are generated. At 1226, a selection of one of the plurality of selectable options is received. At 1228, the modified message is transmitted from the device corresponding to the selected option to the first computing device.

FIG. 13 depicts an illustrative example of an interactive messaging interface with options generated based on a context of a first message, in accordance with some exemplary embodiments. In some embodiments, one or more parts of or the entirety of the system is configured as a system implementing various features, processes, and components of FIGS. 1-12. Although FIG. 4 shows a certain number of components, in various examples, the interactive system may include fewer than the illustrated number of components and/or multiples of one or more of the illustrated number of components.

It should be noted that the message interfaces depicted in FIG. 13 or any step thereof could be performed on, or provided by, any device shown in FIG. 4 and can incorporate various user interfaces (e.g., on display 410 of FIG. 4). For example, the message interfaces depicted in FIG. 13 may be executed by control circuitry 408 (FIG. 4) of user equipment exemplified by computing device 402. In addition, one or more steps of the message interfaces depicted in FIG. 13 may be incorporated into or combined with one or more steps of any other process or embodiment (e.g., starting at process block 502 in message modification process 502 of FIG. 5, starting at process block 602 in message modification process 600 of FIG. 6, starting at process block 802 in message modification process 800 of FIG. 8, starting at process block 902 in message modification process 900 of FIG. 9, starting at process block 1102 in message modification process 1100 of FIG. 11, starting at process block 1202 in message modification process 1200 of FIG. 12 or processes relative to various embodiments, as depicted by but not limited to message modification scenario 100 of FIG. 1, message modification scenario 200 of FIG. 2, and message modification scenario 300 of FIG. 3, including the various processes depicted in or carried out through FIGS. 7 and 13). In addition, FIGS. 1-3 provide depictions of exemplary embodiments of the processes described herein as executed by message modification and transmission system 400.

Messaging interface 1300A includes message notification 1302 indicating a computing device has received a message. Also included is source identifier 1304, which may be used to identify chains of communication and devices corresponding to a sending computing device. Message content 1306 includes at least a string of characters corresponding to a message subject matter. Format notice 1308 corresponds to a flag that may be sent with the message corresponding to message notification 1302 to indicate a context in which the message was sent (e.g., the context might be a translation application source for the message). Format icon 1318 corresponds to format notice 1308 and provides the viewer of the message with information regarding the application or context used to generate the message.

Messaging interface 1300B includes message draft 1320, which may represent a response to the message received and viewed through messaging interface 1300A. Recipient identifier 1322 is populated by the drafter of message draft 1320 and may correspond to source identifier 1304, establishing a chain of communication between a pair of computing devices. Device status 1324 includes an indication that the device shown by device icon 1326 is the current device selected to receive a responsive message, a type of the device, and an indication that the target device is capable of supporting the context required to respond to the first message (e.g., capable of including a translation for text-to-voice). Secondary device icons 1328a-c show a plurality of devices connected to the device represented by device icon 1326, which are all determined to be accessible in some form to the recipient corresponding to recipient identifier 1322. Paired with each of secondary device icons 1328a-c are secondary device status 1330a-c, respectively, which report the same information as device status 1324 and may incorporate application icons indicating the ability of each of the secondary devices to support a particular context (e.g., attaching a flag such that a received message will be translated from text-to-voice).

Messaging interface 1300C includes notification 1332 such that a user of a first computing device that sent the message received in messaging interface 1300A can be notified that the chain of communication is continuing. Sender identifier 1334 indicates to the user of the first computing device the source of the received message. Message content 1336 provides a visual display of the message received and will be used to determine context of the chain of communication. Format notice 1338 is paired with format icon 1340 to indicate to a user an application type used to format a received message. Format icon 1340 provides the viewer of the message with information regarding the application or context used to generate the message and also provide an indication for the recipient of the message regarding how the message can be perceived.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there behind may be performed at a receiving device, a sending device, or some device or processor there between.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
   receiving, at a first computing device via a messaging application, a message for transmission to a second computing device via a communication network;
   identifying a plurality of devices communicatively coupled, via one or more local communication paths, to the second computing device; and
   generating, for display at the first computing device within the messaging application, a plurality of selectable options corresponding to the plurality of devices, respectively, wherein the generating comprises:
      generating, based on a device type of the second computing device, a preview of the message formatted to transmit to the second computing device; and
      generating, based on respective device types of each of the plurality of devices communicatively coupled to the second computing device, a plurality of respective previews of the message formatted to transmit to each respective device of the plurality of devices communicatively coupled to the second computing device.

2. The method of claim 1, wherein identifying the plurality of devices communicatively coupled to the second computing device comprises:
   identifying a user profile on the second computing device; and
   determining, based on the user profile, the plurality of devices communicatively coupled to the second computing device by a local communication stream.

3. The method of claim 2, further comprising:
   determining a location of the second computing device; and
   identifying a plurality of devices associated with the user profile within a threshold proximity of the second computing device, wherein the threshold proximity is defined by an ability of a user of the second computing device to perceive a message received by one of the plurality of devices associated with the user profile.

4. The method of claim 3, further comprising:
determining a respective active status for each of the plurality of devices associated with the user profile; and
transmitting for display within the messaging application at the first computing device each respective active status for each of the plurality of devices.

5. The method of claim 1, further comprising:
determining a first device type of the first computing device and a second device type of the second computing device;
comparing the first device type to the second device type; and
in response to determining the first device type does not match the second device type, modifying the communication for transmission from the first computing device.

6. The method of claim 5, further comprising:
determining a respective device type for each of the plurality of devices communicatively coupled to the second computing device;
comparing each respective device type to the first device type; and
in response to determining the first device type matches at least one of the respective device types of the plurality of devices, generating a recommendation to transmit the message to a corresponding device of the plurality of devices communicatively coupled to the second computing device that has a device type that matches the first device type.

7. The method of claim 1, wherein generating, for display at the first computing device within the messaging application, the plurality of selectable options corresponding to the plurality of devices, respectively, comprises:
generating, at the first computing device, a respective plurality of primary icons corresponding to each of the plurality of devices communicatively coupled to the second computing device; and
generating, at the first computing device, a respective plurality of secondary icons corresponding to a status of each of the plurality of devices communicatively coupled to the second computing device.

8. The method of claim 1, further comprising:
identifying a context of the message;
determining, based on the context of the message, a modification of the message to each device of the plurality of devices communicatively coupled to the second device; and
generating, at the first computing device, a selectable icon that recommends either the second computing device or a device of the plurality of devices communicatively coupled to the second computing device that is configured to support the message modified based on the context of the message.

9. The method of claim 1, further comprising:
identifying a source of subject matter of the message, wherein the source is either a uniform resource locator or an application;
determining, based on the source of subject matter of the message, a modification required to transmit the message to each device of the plurality of devices communicatively coupled to the second device; and
generating, at the first computing device, an icon that recommends either the second computing device or a device of the plurality of devices communicatively coupled to the second computing device that is configured to support the message modified based on the source of the message.

10. A system comprising:
a communication port;
a memory storing instructions; and
control circuitry communicably coupled to the memory and the communication port and configured to execute the instructions to:
receive, at a first computing device via a messaging application, a message for transmission to a second computing device via a communication network;
identify a plurality of devices communicatively coupled, via one or more local communication paths, to the second computing device; and
generate, for display at the first computing device within the messaging application, a plurality of selectable options corresponding to the plurality of devices, respectively, wherein the generating comprises, the control circuitry further configured to:
generate, based on a device type of the second computing device, a preview of the message formatted to transmit to the second computing device; and
generate, based on respective device types of each of the plurality of devices communicatively coupled to the second computing device, a plurality of respective previews of the message formatted to transmit to each respective device of the plurality of devices communicatively coupled to the second computing device.

11. The system of claim 10, wherein the control circuitry configured to identify the plurality of devices communicatively coupled to the second computing device is further configured to:
identify a user profile on the second computing device; and
determine, based on the user profile, the plurality of devices communicatively coupled to the second computing device by a local communication stream.

12. The system of claim 11, wherein the control circuitry is further configured to:
determine a location of the second computing device; and
identify a plurality of devices associated with the user profile within a threshold proximity of the second computing device, wherein the threshold proximity is defined by an ability of a user of the second computing device to perceive a message received by one of the plurality of devices associated with the user profile.

13. The system of claim 12, wherein the control circuitry is further configured to:
determine a respective active status for each of the plurality of devices associated with the user profile; and
transmit for display within the messaging application at the first computing each respective active status for each of the plurality of devices.

14. The system of claim 10, wherein the control circuitry is further configured to:
determine a first device type of the first computing device and a second device type of the second computing device;
compare the first device type to the second device type; and
in response to determining the first device type does not match the second device type, modify the communication for transmission from the first computing device.

15. The system of claim 14, wherein the control circuitry is further configured to:
- determine a respective device type for each of the plurality of devices communicatively coupled to the second computing device;
- compare each respective device type to the first device type; and
- in response to determining the first device type matches at least one of the respective device types of the plurality of devices, generate a recommendation to transmit the message to a corresponding device of the plurality of devices communicatively coupled to the second computing device that has a device type that matches the first device type.

16. The system of claim 10, wherein the control circuitry configured to generate, for display at the first computing device within the messaging application, the plurality of selectable options corresponding to the plurality of devices, respectively, is further configured to:
- generate, at the first computing device, a respective plurality of primary icons corresponding to each of the plurality of devices communicatively coupled to the second computing device; and
- generate, at the first computing device, a respective plurality of secondary icons corresponding to a status of each of the plurality of devices communicatively coupled to the second computing device.

17. The system of claim 10, wherein the control circuitry is further configured to:
- identify a context of the message;
- determine, based on the context of the message, a modification of the message to each device of the plurality of devices communicatively coupled to the second device; and
- generate, at the first computing device, a selectable icon that recommends either the second computing device or a device of the plurality of devices communicatively coupled to the second computing device that is configured to support the message modified based on the context of the message.

18. The system of claim 10, wherein the control circuitry is further configured to:
- identify a source of subject matter of the message, wherein the source is either a uniform resource locator or an application;
- determine, based on the source of subject matter of the message, a modification required to transmit the message to each device of the plurality of devices communicatively coupled to the second device; and
- generate, at the first computing device, an icon that recommends either the second computing device or a device of the plurality of devices communicatively coupled to the second computing device that is configured to support the message modified based on the source of the message.

* * * * *